(12) United States Patent
Gozdz et al.

(10) Patent No.: US 7,318,982 B2
(45) Date of Patent: *Jan. 15, 2008

(54) POLYMER COMPOSITION FOR ENCAPSULATION OF ELECTRODE PARTICLES

(75) Inventors: Antoni S. Gozdz, Marlborough, MA (US); Andrew L. Loxley, Roslindale, MA (US); Anthony E. Pullen, Belmont, MA (US)

(73) Assignee: A123 Systems, Inc., Watertown, MA (US)

( * ) Notice: Subject to any disclaimer, the term of this patent is extended or adjusted under 35 U.S.C. 154(b) by 416 days.

This patent is subject to a terminal disclaimer.

(21) Appl. No.: 10/876,179

(22) Filed: Jun. 23, 2004

(65) Prior Publication Data

US 2005/0034993 A1    Feb. 17, 2005

Related U.S. Application Data

(60) Provisional application No. 60/480,535, filed on Jun. 23, 2003.

(51) Int. Cl.
  *H01M 4/60* (2006.01)
(52) U.S. Cl. ............ 429/213; 428/403; 428/407; 429/212; 429/217; 429/233; 429/234; 429/245; 429/246
(58) Field of Classification Search ........... 429/213, 429/212, 217, 233, 234, 245, 246; 428/403, 428/407
See application file for complete search history.

(56) References Cited

U.S. PATENT DOCUMENTS

| | | | |
|---|---|---|---|
| 3,765,943 A | 10/1973 | Biagetti | |
| 3,864,167 A | 2/1975 | Broadhead et al. | |
| 4,245,016 A | 1/1981 | Rampel | |
| 4,555,454 A | 11/1985 | Shuster | |
| 4,599,114 A | 7/1986 | Atkinson | |
| 4,615,784 A | 10/1986 | Stewart et al. | |
| 4,668,596 A | 5/1987 | Shacklette et al. | |
| 4,758,483 A | 7/1988 | Armand et al. | |
| 4,889,777 A | 12/1989 | Akuto | |
| 5,100,747 A | 3/1992 | Hayashida et al. | |
| 5,187,209 A | 2/1993 | Hirai et al. | |

(Continued)

FOREIGN PATENT DOCUMENTS

CA    2270771    10/2000

(Continued)

OTHER PUBLICATIONS

Aleshin et al. (1998) "Transport properties of poly (3,4-ethylenedioxythiophene/poly(styrenesulfonate)", Synthetic Metals, 94 pp. 173-177.

(Continued)

*Primary Examiner*—Carol Chaney
*Assistant Examiner*—Elizabeth Robinson
(74) *Attorney, Agent, or Firm*—Wilmer Cutler Pickering Hale & Dorr LLP

(57) ABSTRACT

Compositions and methods are provided for coating electroactive particles. Coating materials include a conductive component and a low refractive index component. Coatings are provided in which the conductive and low refractive index components are linked and/or do not form phases having lengthscales greater than about 0.25 μm. Coatings are provided in which the components are contained in sequential layers.

48 Claims, 4 Drawing Sheets

U.S. PATENT DOCUMENTS

| | | | |
|---|---|---|---|
| 5,213,895 A | 5/1993 | Hirai et al. | |
| 5,227,267 A | 7/1993 | Goebel et al. | |
| 5,294,504 A | 3/1994 | Otagawa et al. | |
| 5,399,447 A | 3/1995 | Chaloner Gill et al. | |
| 5,405,937 A * | 4/1995 | Lemaire et al. | 528/377 |
| 5,436,093 A | 7/1995 | Huang et al. | |
| 5,441,830 A | 8/1995 | Moulton et al. | |
| 5,464,707 A | 11/1995 | Moulton et al. | |
| 5,478,676 A | 12/1995 | Turi et al. | |
| 5,518,833 A | 5/1996 | Repplinger et al. | |
| 5,520,850 A | 5/1996 | Chaloner Gill et al. | |
| 5,527,641 A | 6/1996 | Koshiishi et al. | |
| 5,554,459 A | 9/1996 | Gozdz et al. | |
| 5,567,754 A | 10/1996 | Stramel | |
| 5,578,396 A | 11/1996 | Fauteux et al. | |
| 5,587,253 A | 12/1996 | Gozdz et al. | |
| 5,588,971 A | 12/1996 | Fauteux et al. | |
| 5,589,297 A | 12/1996 | Koga et al. | |
| 5,591,544 A | 1/1997 | Fauteux et al. | |
| 5,624,605 A | 4/1997 | Cao et al. | |
| 5,654,115 A | 8/1997 | Hasebe et al. | |
| 5,677,080 A | 10/1997 | Chen | |
| 5,698,342 A | 12/1997 | Klein | |
| 5,705,291 A | 1/1998 | Amatucci et al. | |
| 5,714,053 A | 2/1998 | Howard | |
| 5,733,683 A | 3/1998 | Searson et al. | |
| 5,759,714 A | 6/1998 | Matsufuji et al. | |
| 5,789,100 A | 8/1998 | Burroughs et al. | |
| 5,821,033 A | 10/1998 | Cromack et al. | |
| 5,827,615 A | 10/1998 | Touhsaent | |
| 5,834,136 A | 11/1998 | Gao et al. | |
| 5,840,087 A | 11/1998 | Gozdz et al. | |
| 5,897,522 A | 4/1999 | Nitzan | |
| 5,902,689 A | 5/1999 | Vleggaar et al. | |
| 5,910,382 A | 6/1999 | Goodenough et al. | |
| 5,925,283 A | 7/1999 | Taniuchi et al. | |
| 6,063,519 A | 5/2000 | Barker et al. | |
| 6,069,221 A | 5/2000 | Chasser et al. | |
| RE36,843 E | 8/2000 | Lake et al. | |
| 6,096,453 A | 8/2000 | Grunwald | |
| 6,096,454 A | 8/2000 | Tran et al. | |
| 6,117,593 A | 9/2000 | Stachoviak et al. | |
| 6,120,940 A | 9/2000 | Poehler et al. | |
| 6,136,476 A | 10/2000 | Schutts et al. | |
| 6,159,389 A | 12/2000 | Miura et al. | |
| 6,174,623 B1 | 1/2001 | Shackle | |
| 6,231,779 B1 | 5/2001 | Chiang et al. | |
| 6,280,875 B1 | 8/2001 | Kwak et al. | |
| 6,291,097 B1 | 9/2001 | Barker et al. | |
| 6,300,016 B1 | 10/2001 | Jan et al. | |
| 6,306,540 B1 | 10/2001 | Hiroi et al. | |
| 6,322,924 B1 | 11/2001 | Hirahara et al. | |
| 6,337,156 B1 | 1/2002 | Narang et al. | |
| 6,342,317 B1 | 1/2002 | Patel et al. | |
| 6,395,429 B1 | 5/2002 | Kang et al. | |
| 6,403,263 B1 | 6/2002 | Roach | |
| 6,410,189 B1 | 6/2002 | Yamada et al. | |
| 6,413,284 B1 | 7/2002 | Chu et al. | |
| 6,413,285 B1 | 7/2002 | Chu et al. | |
| 6,495,283 B1 | 12/2002 | Yoon et al. | |
| 6,511,780 B1 * | 1/2003 | Veregin et al. | 430/111.35 |
| 6,528,033 B1 | 3/2003 | Barker et al. | |
| 6,599,662 B1 | 7/2003 | Chiang et al. | |
| 6,753,111 B2 | 6/2004 | Kweon et al. | |
| 6,764,525 B1 | 7/2004 | Whitacre et al. | |
| 6,797,435 B2 | 9/2004 | Kweon et al. | |
| 6,800,399 B2 | 10/2004 | Matsumoto | |
| 6,818,356 B1 | 11/2004 | Bates | |
| 6,878,487 B2 | 4/2005 | Cho et al. | |
| 7,087,348 B2 * | 8/2006 | Holman et al. | 429/209 |
| 2001/0005558 A1 | 6/2001 | Yoshioka et al. | |
| 2001/0005562 A1 | 6/2001 | Yoshioka et al. | |
| 2001/0007726 A1 | 7/2001 | Yoshioka et al. | |
| 2002/0015278 A1 | 2/2002 | Fukuyama et al. | |
| 2002/0036282 A1 | 3/2002 | Chiang et al. | |
| 2002/0048706 A1 | 4/2002 | Mayes et al. | |
| 2002/0071990 A1 | 6/2002 | Kweon et al. | |
| 2002/0071991 A1 | 6/2002 | Kweon et al. | |
| 2002/0074972 A1 | 6/2002 | Narang et al. | |
| 2002/0192137 A1 | 12/2002 | Chaloner-Gill et al. | |
| 2002/0195591 A1 | 12/2002 | Ravet et al. | |
| 2003/0003352 A1 | 1/2003 | Kweon et al. | |
| 2003/0008212 A1 | 1/2003 | Akashi et al. | |
| 2003/0049529 A1 | 3/2003 | Cho et al. | |
| 2003/0054250 A1 | 3/2003 | Kweon et al. | |
| 2003/0082446 A1 | 5/2003 | Chiang et al. | |
| 2003/0099884 A1 | 5/2003 | Chiang et al. | |
| 2004/0005265 A1 | 1/2004 | Chiang et al. | |
| 2004/0018429 A1 | 1/2004 | Kweon et al. | |
| 2004/0018430 A1 * | 1/2004 | Holman et al. | 429/233 |
| 2004/0151887 A1 | 8/2004 | Forrest et al. | |
| 2004/0185343 A1 | 9/2004 | Wang et al. | |
| 2004/0265692 A1 | 12/2004 | Long et al. | |
| 2005/0026037 A1 | 2/2005 | Riley et al. | |
| 2005/0034993 A1 | 2/2005 | Gozdz et al. | |

FOREIGN PATENT DOCUMENTS

| | | |
|---|---|---|
| EP | 0 071 119 | 2/1983 |
| EP | 1 231 651 | 8/2002 |
| EP | 1 231 653 | 8/2002 |
| JP | 04-58455 | 2/1992 |
| JP | 07101728 | 4/1995 |
| JP | 09022693 | 1/1997 |
| JP | 09147862 | 6/1997 |
| WO | WO-98/12761 | 3/1998 |
| WO | WO-98/16960 | 4/1998 |
| WO | WO-99/33129 | 7/1999 |
| WO | WO-99/56331 | 11/1999 |
| WO | WO-00/41256 | 7/2000 |
| WO | WO-01/77501 | 10/2001 |
| WO | WO-02/43168 | 5/2002 |
| WO | WO-03/012908 | 2/2003 |
| WO | WO-03/056646 | 7/2003 |

OTHER PUBLICATIONS

Armand et al. (1979) "Fast Ion Transport in Solids," Proceedings of the International conference on Fast ion Transport in Solids, Electrodes and Electrolytes, Lake Geneva, Wisconsin, p. 31.

Bouridah et al.(1985) "Poly(Dimethylsiloxane)-Poly(Ethylene Oxide) Based Polyurethane Networks Used as Electrolytes in Lithium Electrochemical Solid State Batteries," Solid State Ionics, 15 pp. 233-240.

Broadhead et al. (1995) "Electrochemical Principles and Reactions", Handbook of Batteries, Ch. 2.

Chiang et al. (1999) High Capacity, Temperature-Stable Lithium Aluminum Manganese Oxide Cathodes for Rechargeable Batteries, Electrochem. Sol. St. Lett. 2(3), pp. 107-110.

French et al. (1995) "Full Spectral Calculation of Non-Retarded Hamaker Constants for Ceramic Systems from Interband Transition Strengths," Solid State Ionics, 75, pp. 13-33.

French (2000) "Origins and Applications of London Dispersion Forces and Hamaker Constants in Ceramics" Journal of the American Ceramic Society, 83[9], 2117-46.

Ghosh et al. (1998) "Supramolecular Self-Assembly for Enhanced Conductivity in Conjugated Polymer Blends: Ionic Crosslinking in Blending of Poly(3,4-ethylenedioxythiophene)-Poly(styrenesulfonate) and Poly(vinylpyrrolidone)" Adv. Mater, 10:1097.

Gray (1991) "Solid Polymer Electrolytes: Fundamentals and Technological Applications," VCH, New York.

Hart et al. (2003) "3-D Microbatteries," Electrochemistry Communications, No. 5, pp. 120-123.

Idota et al. (1997) "Tin-Based Amorphous Oxide: A high Capacity Lithium-Ion-Storage Material" Science, 276, p. 1395.

Kuwabata et al. (1999) "Charge-discharge properties of composites of LiMn2O4 and polypyrrole as positive electrode materials for 4 V class of rechargeable Li Batteries " Electrochimica Acta, 44:4593-4600.

LeCras et al. (1996) "Lithium intercalation in Li-Mg-Mn-O and Li-Al-Mn-O spinels," Solid State Ionics, 89 pp. 203-213.

Limthongkul et al. (2001) "Nanocomposite Li-Ion Battery Anodes Produced by the Partial Reduction of Mixed Oxides, " Chem. Mater, 13, pp. 2397-2402.

Linden (1995) "Handbook of Battereis" Second Edition, McGraw-Hill, Inc., p. 2, 19.

Matsumoto et al. (1992) "Vaporization of Graphite in Plasma Arc and Identification of C60 in Deposit," J. Electrochem. Soc., vol. 139 No. 1.

Milling et al. (1996) "Direct Measurement of Repulsive van der Waals interactions using an Atomic Force Microscope" Journal of Colloid and Interface Science, 180, pp. 460-465.

Minnet et al. (1988), "Polymeric Insertion Electrodes," Solid State Ionics, 28-30 1192-1196.

Nagaoka et al., "High Ionic Conductivity in Poly(dimethyl Siloxane-co-Ethylene Oxide) Dissolving Lithium Perchlorate," Dept of Chemistry, Sophia University, pp. 659-663.

Neumann et al. (1979) "Negative Hamaker Coefficients" Colloid and Polymer Sci., 257, pp. 413-419.

Ohzuku et al. (1995) Synthesis and Characterization of LiAL1/4Ni3/4O2 for Lithium-Ion (Shuttle Cock) Batteries, J. Electrochem. Soc., vol. 143, p. 4033.

Van Oss et al. (1977) "Comparison Between Antigen-Antibody Binding Energies" Imunnunol. Comm., 6(4), pp. 341-354.

Van Oss et al. (1979) "Repulsive Van Der Waals Foces" Imunnunol. Comm., (8)1, pp. 11-29.

Van Oss et al. (1979) "Repulsive van der Waals Forces" Separation Sci. Tech. 14(4), pp. 305-317.

Van Oss et al. (1980) "Applications of Net Repulsive Van der Waals forces between different particles, macromolecules or biological cells in liquids" Colloids and Surfaces, 1, pp. 45-56.

Wang et al. (2002) "All Solid State Ll/LixMnO2 Polymer Battery Using Ceramic Modified Polymer Electrolytes", Journal of Electrochem. Soc. 149 (8), A967.

Zallen, (1983) "The Physics of Amorphous Materials," J. Wiley & Sons, N.Y.

\* cited by examiner

POLYMER COMPOSITION FOR ENCAPSULATION OF ELECTRODE PARTICLES

CROSS-REFERENCE TO RELATED APPLICATIONS

This application claims priority to U.S. Provisional Application No. 60/480,535, filed on Jun. 23, 2003.

BACKGROUND

In self-assembled electrochemical devices, electrodes (anode and cathode) are formed from particles dispersed in an ionically conductive electrolyte phase. In the electrode structure, particles of like type contact one another due to attractive forces, while particles of unlike type are separated from one another due to repulsive forces. The magnitude of separation between unlike particles is generally at least some tens of nanometers to prevent electronic shorting of the device. An electrolyte typically occupies the area of separation between unlike particles.

The balance of attraction and repulsion between two types of particles in a self-assembled electrochemical device can be achieved via London dispersion forces: like particles generally attract one another when dispersed in a liquid medium, while unlike particles repel one another if the respective refractive indices of the first type of particle, the intervening liquid, and the second type of particle increase or decrease monotonically. Typical anode and cathode materials used in lithium secondary batteries (e.g., carbon and $Li CoO_2$ (LCO), respectively) generally both have higher refractive indices than typical electrolyte materials. Accordingly, a monotonic change in refractive index in a self-assembled electrochemical device can be achieved by coating one type of electrode particle (anode or cathode) with an encapsulant material that has a refractive index below that of the electrolyte phase, which in turn has a refractive index below that of the other type of electrode particle. Often, the encapsulant material is electronically and ionically conductive, thus providing enhanced performance of the self-assembled electrochemical device, e.g., battery charge and discharge. For example, encapsulant electronic conductivity can be at least 1 S/cm, and encapsulant ionic conductivity can be on the order of $1 \times 10^{-5}$ S/cm. Higher conductivities of both types generally lead to improved device performance.

In a self-assembled battery system, the encapsulant generally is applied as a thin layer around the anode or cathode particles (typically less than about 5% by volume of any particle), so that the energy density of the battery is not compromised. To enhance the electronic conductivity of the electrode that is formed from the encapsulated active particles, it is generally desirable for the area of inter-particle contact (the "neck") to be as large as possible. To serve this purpose, it is useful for the encapsulant material to be compliant and able to deform on particle contact, for example, during drying, curing or post-processing of the self-assembled electrochemical device.

Encapsulant materials for active particles in a self-assembled electrochemical device can include at least two components, e.g., a conductive component and a low refractive index component. The components' composition and proportions are varied to provide the desired properties of conductivity and refractive index. It is generally desirable to reduce the lengthscale of separation between the two components (i.e., the size of any phases formed by the two components individually) in the final encapsulant film, to prevent shorting of unlike particles. As the lengthscale of separation is reduced (i.e., there is less phase separation between the conductive and low refractive index components), the composite encapsulant film becomes more homogeneous, such that attractive and repulsive forces exerted by the coated particle surfaces are more homogeneous and uniform. In contrast, when greater lengthscales of phase separation exist in an encapsulant film (e.g., phases with dimensions larger than the distances between the electroactive particles of a system), the resulting heterogeneity at the surface of coated particles can result in attractive forces between unlike particles, thus causing undesirable shorting of the electrochemical device.

Blends of dispersions of a low refractive-index polymer (polytetrafluoroethylene, PTFE) with dispersions of a conductive polymer (Baytron® P, Bayer AG, poly 3,4-ethylenedioxythiophene/polystyenesulfonic acid complex) have been identified as useful materials for encapsulating particles for use in a self-assembled battery system. In such encapsulant materials, the smallest lengthscale of separation between the low refractive index phase and the conductive phase is represented by the dispersed particle size (for PTFE, 10 nm to 100 nm; for Baytron P, about 40 nm). Composite films of such encapsulants are formed on active particles using processes such as spray drying that allow for little control of the encapsulant coating thickness. These encapsulating materials are described generally in co-pending International Published Application WO 03/012908, which is incorporated herein by reference.

SUMMARY

Materials and methods are provided that are useful for encapsulating electrode particles of a self-assembled electrochemical device, such as a self-assembled battery system. In certain embodiments, encapsulating materials as described herein provide one or more advantageous functional properties such as, for example, high electronic and/or ionic conductivity, low refractive index, and/or the ability to be deposited in thin layers on the surface of active particles. In at least some instances, an encapsulant material includes a conductive component and a low refractive index component. The conductive component is ionically and/or electronically conductive. Typically, the conductive component is at least electronically conductive, with a conductivity of at least about $10^{-2}$ S/cm, in some instances at least about $10^{-1}$ S/cm, or at least about 1 S/cm. For coating electroactive particles for use in a self-assembled electrochemical device having electrodes and an electrolyte, the low refractive index component generally has a refractive index that is lower than that of the electrolyte (or precursor thereof) and lower than that of the electroactive material of one of the electrodes. A low refractive index material typically has a refractive index less than about 2.0, e.g., less than about 1.5. In some instances, a low refractive index material has a refractive index between about 1.25 and about 1.4. In some embodiments, the lengthscales of any phases formed by the conductive and low refractive index components are very small, e.g., about 0.25 µm or less, and in some instances about 0.1 µm or less, for example, less than about 0.05 µm, or less than about 0.01 µm. In certain embodiments, the conductive and low refractive index components are linked, i.e., connected by covalent or ionic bonding to form part of a single polymer.

One aspect of the invention is a coated electroactive particle, for example, including an anode material or a cathode material. The coating is desirably thin to promote high energy density, and typically represents less than about 10 vol. %, for example, less than about 5 vol. %, less than about 2 vol. %, or less than about 1 vol. %, of the particle. The coating includes a polymer having a conductive component and a low refractive index component. The conductive component and the low refractive index component are linked, in some instances by ionic bonding, and in some instances by covalent bonding. In certain embodiments, the polymer is a conductive polymer that has been modified to include moieties of low refractive index. In some embodiments, the polymer is a block copolymer of a conductive polymer and a low refractive index polymer. In certain embodiments, the polymer is a graft copolymer having a conductive polymer backbone with low refractive index polymer side chains. In other embodiments, the polymer is a graft copolymer having a low refractive index polymer backbone with conductive polymer side chains. In some embodiments, the low refractive index component includes fluorine, for example, one or more fluoroalkyl and/or fluoroaryl groups.

In certain embodiments, the polymer has an electronic conductivity of at least about $10^{-2}$ S/cm, in some instances at least about $10^{-1}$ S/cm, or at least about 1 S/cm. In some embodiments, the conductive component includes one or more groups selected from polyaniline, polypyrrole, polyacetylene, polyphenylene, polythiophene, polyalkylenedioxythiophene, and combinations thereof. In certain embodiments, the polymer includes one or more groups selected from Structures I-V:

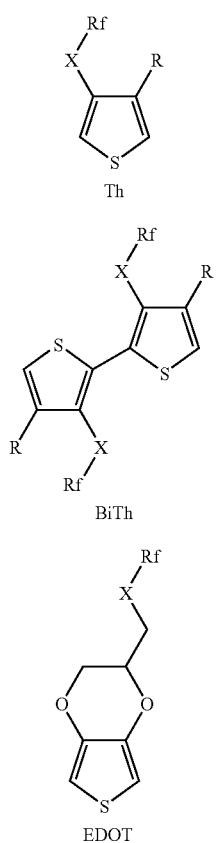

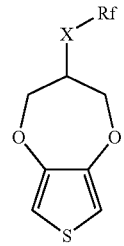

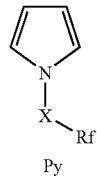

wherein Rf is a fluorinated alkyl group, aryl group, or combination thereof, X is a linking group attaching Rf to the polymer backbone, and R is a pendant group chosen from X-Rf, H, and $C_1$-$C_{15}$ alkyl. In some such embodiments, X includes one or more groups selected from alkyl, ether, thioether, ester, thioester, amine, amide, and benzylic groups. In some embodiments, the polymer includes one or more groups selected from EDOT-F (pentadecafluoro octanoic acid 2,3-dihydro-thieno[3,4-b][1,4]dioxin-2-ylmethyl ester), Th-O-1,7 (3-pentadecafluorooctyloxythiophene), Me-Th-O-1,7 (3-methyl-4-pentadecafluorooctyloxythiophene), and PrODOT-F (propylenedioxythiophene pentadecafluorooctane ester).

In certain embodiments, the coating is deposited by chemical or electrochemical polymerization of one or more monomers onto the surface of the electroactive particle. In some embodiments, the polymerization includes polymer growth into a continuous shell on the surface of the electroactive particle. The continuous shell is formed by polymers that are not directly bound to the particle surface, and instead are bound only to each other in a network-like fashion to form a blanket-like shell around the particle. The monomers and/or growing polymers associate with the particle through electrostatic interactions, such that the growing polymer is in close proximity to allow for polymerization into a continuous shell. In some embodiments, the polymerization includes polymer growth from one or more monomers chemically bound to the surface of the electroactive particle.

In certain embodiments, the coating also includes a second polymer that is conductive. In some such embodiments, the coating includes an underlayer containing the second conductive polymer and an overlayer containing the polymer having a conductive component and a low refractive index component. In some such embodiments, the coating is deposited by chemical or electrochemical polymerization of the second conductive polymer onto the surface of the electroactive particle, followed by chemical or electrochemical polymerization of the polymer having a conductive component and a low refractive index component onto the surface of the electroactive particle coated with the second conductive polymer.

Another aspect of the invention provides a coated electroactive particle, wherein the coating includes a homogeneous blend of a conductive polymer and a low refractive index polymer. The conductive polymer and the low refractive index polymer do not form phases with lengthscales larger than about 0.25 μm, and in some instances do not form phases with lengthscales larger than about 0.1 μm, about 0.05 μm, or about 0.01 μm. In some embodiments, the conductive polymer is chosen from polyanilines, polypyrroles, polyacetylenes, polyphenylenes, polythiophenes, polyalkylenedioxythiophenes, derivatives thereof, and combinations thereof. In some embodiments, the low refractive index polymer is chosen from polytetrafluoroethylene, poly (fluoroalkyl)acrylates, poly(fluoroalkyl)methacrylates, amorphous fluoropolymers, derivatives thereof, and combinations thereof.

Another aspect provides a coated electroactive particle, wherein the coating includes a first layer including a conductive component and a second layer including a low refractive index component. In some embodiments, each of the first and second layers has a thickness of about 0.2 μm or less, for example, about 0.1 μm or less. In some embodiments, the second layer also includes a conductive component. In some such embodiments, the low refractive index component and the conductive component of the second layer are linked. In certain embodiments, the low refractive index component includes one or more non-conducting polymers chosen from polytetrafluoroethylene, acrylate, methacrylate, and styrene polymers, and derivatives thereof. In some embodiments, the coating is deposited by chemical or electrochemical polymerization of a conductive polymer onto the surface of the electroactive particle, followed by deposition of a non-conducting polymer of low refractive index onto the surface of the electroactive particle coated with the conductive polymer. In some such embodiments, the non-conducting polymer of low refractive index is deposited by vapor phase polymerization or spray drying onto the surface of the electroactive particle coated with the conductive polymer.

Another aspect provides a method for encapsulating an electroactive particle. According to the method, one or more monomers of a conductive polymer and one or more monomers of a low refractive index polymer are provided. The monomers of a conductive polymer and the monomers of a low refractive index polymer are polymerized to form a polymer having a conductive component linked to a low refractive index component. The electroactive particle is coated with the polymer in an amount less than about 10 vol. % of the particle, and in some instances less than about 5 vol. % of the particle.

In certain embodiments of the method, coating the electroactive particle with the polymer includes spray drying the polymer onto the surface of the electroactive particle. In other embodiments, polymerizing the monomers and coating the electroactive particle includes placing the electroactive particle and the monomers in a solvent, and polymerizing the monomers onto the surface of the electroactive particle. In certain embodiments, polymerizing the monomers onto the surface of the electroactive particle includes growing a continuous polymer shell on the surface of the electroactive particle. In some embodiments, polymerizing the monomers onto the surface of the electroactive particle includes chemically binding one or more monomers to the surface of the electroactive polymer and growing a polymer from the one or more bound monomers.

In certain embodiments of the method, polymerizing the monomers comprises contacting the monomers with an oxidant. In some such embodiments, the oxidant is an $Fe^{3+}$ oxidant or $(NH_4)_2S_2O_8$. In certain embodiments, the method includes coating the electroactive particle with a second polymer that is conductive before coating the electroactive particle with the polymer formed by polymerizing the monomers of a conductive polymer and the monomers of a low refractive index polymer.

In some embodiments of the method, the monomers of a conductive polymer are different from the monomers of a low refractive index polymer. In other embodiments, the monomers of a conductive polymer are identical to the monomers of a low refractive index polymer. In some such embodiments, the monomers of a conductive polymer and the monomers of a low refractive index polymer are monomers of a conductive polymer that have been modified to include one or more moieties of low refractive index. In some instances, the conductive polymer is selected from polyanilines, polypyrroles, polyacetylenes, polyphenylenes, polythiophene, polyalkylenedioxythiophenes, derivates thereof, and combinations thereof. In some instances, the moieties of low refractive index include one or more fluorinated groups.

Another aspect provides an electrochemical device including an anode, a cathode, an electrolyte in contact with and separating the anode and cathode, a cathode current collector in electronic communication with the cathode, and an anode current collector in electronic communication with the anode. At least one of the anode and cathode includes an electroactive particle having a coating deposited thereon. In some instances, the coating includes a polymer having a conductive component linked to a low refractive index component. In some instances, the coating contains a first layer including a conductive component and a second layer including a low refractive index component. In some instances, the coating includes a homogeneous blend of a conductive polymer and a low refractive index polymer, wherein the conductive polymer and the low refractive index polymer do not form phases with lengthscales larger than about 0.25 μm, about 0.1 μm, about 0.05 μm, or about 0.01 μm. In certain embodiments, the anode includes coated electroactive particles, and the anode current collector has a coating that includes the same polymer, layers, or blend as the anode particle coating. In certain embodiments, the cathode includes coated electroactive particles, and the cathode current collector has a coating that includes the same polymer, layers, or blend as the cathode particle coating.

Another aspect provides a coated current collector. In some instances, the coating includes a polymer having a conductive component linked to a low refractive index component. In some instances, the coating includes a first layer including a conductive component and a second layer including a low refractive index component. In some instances, the coating includes a homogeneous blend of a conductive polymer and a low refractive index polymer, wherein the conductive polymer and the low refractive index polymer do not form phases with lengthscales larger than about 0.25 μm, about 0.1 μm, about 0.05 μm, or about 0.01 μm.

Another aspect provides a composition for encapsulation of an electroactive particle or current collector, the composition containing a polymer that includes one or more monomer units of Th-O-1,7 (3-pentadecafluorooctyloxythiophene).

BRIEF DESCRIPTION OF THE DRAWING

The following figures are presented for purposes of illustration only and are not intended to be limiting of the invention.

DETAILED DESCRIPTION

One aspect provides encapsulation materials that afford one or more advantageous properties such as, for example, high electronic and/or ionic conductivity, low refractive index, and/or the ability to be deposited in thin layers on the surface of particles. Another aspect provides electroactive particles coated with such encapsulant materials. Electroactive particles include particles of materials that are involved in the electrochemical reaction of an electrochemical device. For example, electroactive materials are located in the electrodes of an electrochemical device, and participate in the redox reaction of the device, e.g., the release or acceptance of an electron. Coated electroactive particles as described herein are useful for forming electrodes in self-assembled electrochemical devices.

Figure 1:
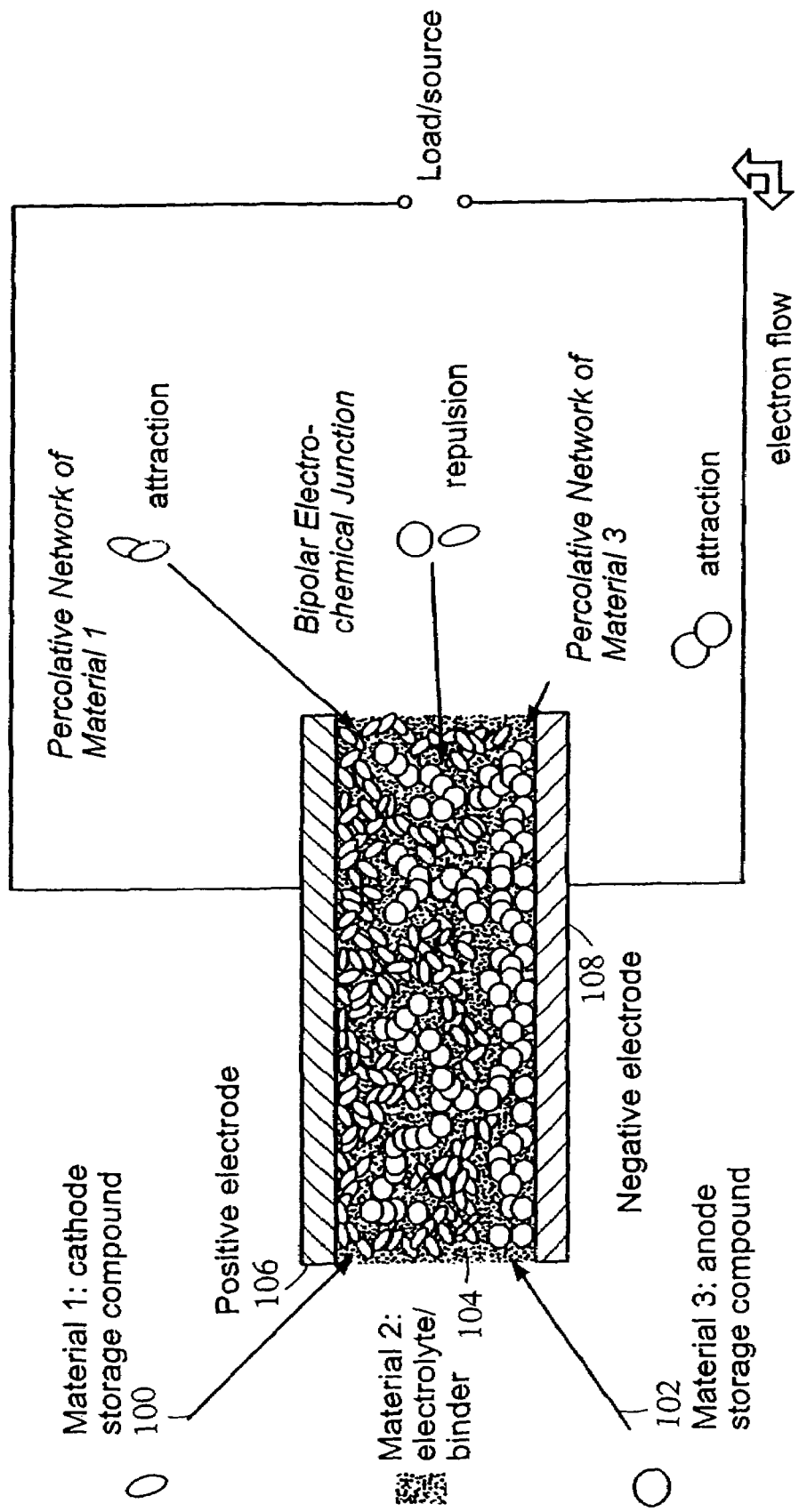
FIG. 1 is a schematic illustration of a self-assembled electrochemical device.

FIG. 1 schematically illustrates an example of a self-assembled electrochemical device. The device includes a cathode storage compound 100 ("material 1") and an anode storage compound 102 ("material 3"), which are both dispersed in an electrolyte 104 ("material 2"). The materials 1 and 3 contact respective current collectors 106, 108. The materials 1, 2, and 3 are selected such that when materials 1 and 3 are dispersed in material 2, materials 1 and 3 repel each other. Also, the particles of material 1 self-attract and thereby aggregate, as do the particles of material 2. The system thus allows for the provision of self-organizing and separated cathode and anode networks. This allows for the formation of a self-organizing, co-continuous, interpenetrating microstructure, in which one electrode is continuously wired to a current collector, and another electrode to another current collector. A repelling dispersion force ensures electronic isolation of the two networks. An alternative device arrangement includes one electrode formed of particles that assembles against a flat surface of the other electrode.

The formation of self-assembled electrochemical devices is described in more detail in co-pending International Published Application WO 03/012908, which is incorporated herein by reference. Briefly, to form an electrochemical device, the self-organizing mixture is cured, and the anode and cathode networks are wired only to anode and cathode current collectors, respectively. In some instances, proper wiring is achieved using surface forces on the anode and cathode particles for proper positioning. The principles that allow the respective networks to form and yet repel each other are used to wire the networks to their respective current collectors. Each current collector has a surface that attracts either the cathode or the anode and repels the other. In some embodiments, at least one of the current collectors is coated to provide the desired attractive and repulsive forces.

Suitable electroactive materials for use in self-assembled electrochemical devices include, but are not limited to, one or more of $LiCoO_2$, $Li(Mg_xCo_{1-x})O_2$, $LiNiO_2$, $LiMn_2O_4$, $LiMnO_2$, $Li(Al_xMn_{1-x})O_2$, doped and undoped $LiFePO_4$, $Li_2Fe_2(SO_4)_3$, $V_2O_5$, $V_6O_{11}$, C, amorphous carbon, graphite, mesocarbon microbeads (MCMB), Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, Sn—B—P—O compounds, and glass. For example, in some instances anode particles include one or more of the following materials: carbon, amorphous carbon, graphite, mesocarbon microbeads, Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, and $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, and glass. In some instances, cathode particles include one or more of the following materials: $LiCoO_2$, $LiCoO_2$ doped with Mg, $LiNiO_2$, $LiMn_2O_4$, $LiMnO_2$, $LiMnO_2$ doped with Al, doped and undoped $LiFePO_4$, $LiMnPO_4$, $LixV_6O_{13}$, $Li_2Fe_2(SO_4)_3$, $V_2O_5$, $V_6O_{11}$, and $SnO_2$.

Suitable materials for use in the separator/electrolyte medium of a self-assembled electrochemical device include, but are not limited to, one or more of the following: organic materials, such as, e.g., poly(ethylene oxide) (PEO), poly (styrene) (PS), poly(acrylonitrile) (PAN), poly(vinylidene fluoride) (PVDF), diiodomethane (DIM), 1,3-diiodopropane, N,N-dimethylformamide (DMF), dimethylpropylene urea (DMPU), ethylene carbonate (EC), diethylene carbonate (DEC), dimethyl carbonate (DMC), propylene carbonate (PC), and block copolymer lithium electrolytes, the preceding organic materials being doped with a lithium salt, such as, e.g., $LiClO_4$, $LiPF_6$, $LiAsF_6$, $LiHgI_3$, $LiCF_3SO_3$ or $LiBF_4$, to provide lithium ionic conductivity; and inorganic materials, such as, e.g., LiI, LiF, LiCl, $Li_2O$—$B_2O_3$—$Bi_2O_3$ compounds including glass, $Li_2O$—$B_2O_3$—$P_2O_5$ compounds including glass, $Li_2O$—$B_2O_3$—PbO compounds including glass, and sols or gels of the oxides or hydroxides of Ti, Zr, Pb, or Bi.

Non-limiting examples of suitable materials for use in anode and cathode current collectors include aluminum, copper, nickel, titanium, and platinum.

Figure 2:
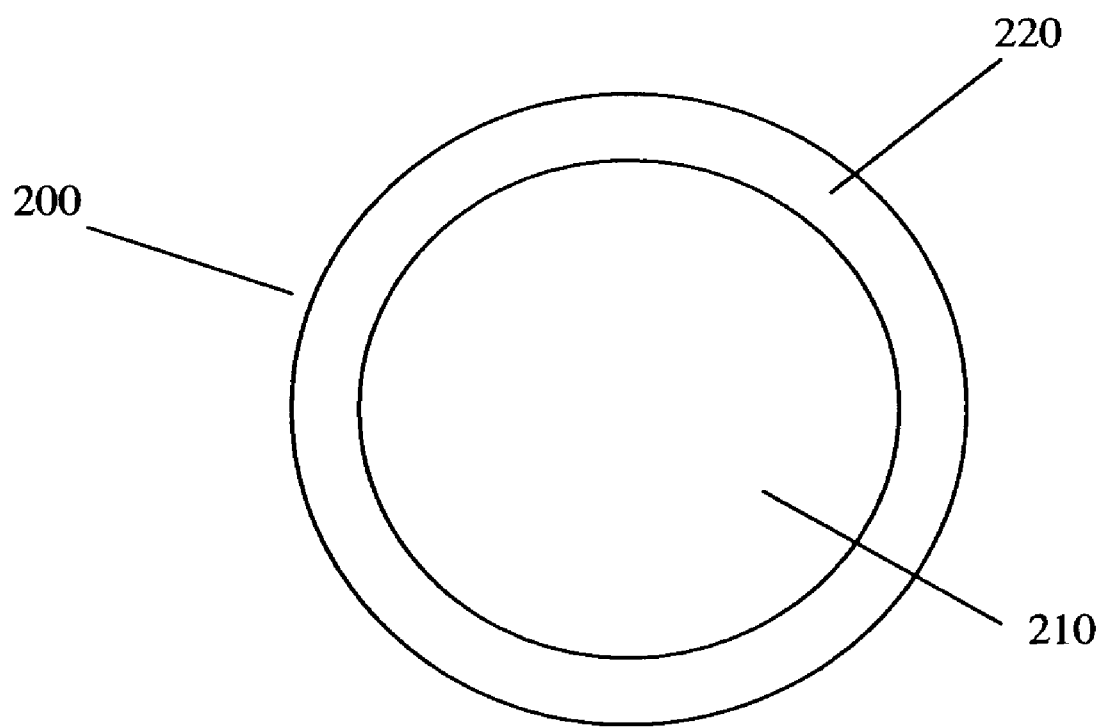
FIGS. 2-3 are schematic illustrations of coated electroactive particles according to certain embodiments.

Encapsulant materials as described herein are useful for coating electroactive particles to provide the desired balance of attractive and repulsive forces between the electrode particles of a self-assembled electrochemical device. FIG. 2 is a schematic illustration of a coated electroactive particle 200 including a core of electroactive material 210 and a coating 220 of encapsulant material. In at least some instances, the encapsulant coating 220 is a thin layer, e.g., representing less than about 10 vol. % of the particle, in some instances less than about 5 vol. % of the particle, less than about 2 vol. % of the particle, or less than about 1 vol. % of the particle. In some embodiments, the encapsulant coating 220 is made up of multiple layers.

In at least some instances, an encapsulant material is compliant, and able to deform on particle contact. This allows for increased contact area ("neck" formation) between neighboring encapsulated particles making up an electrode, thus promoting electronic conductivity. Suitable materials for use in encapsulants as described herein include soluble polymers (and monomers), which can be placed onto an active particle surface from solution, and insoluble polymers (and monomers), which can be deposited onto an active particle surface by precipitation during polymerization.

The encapsulant material includes a conductive component and a low refractive index component. The conductive component is ionically and/or electronically conductive. Typically, the conductive component is at least electronically conductive. In at least some embodiments, the low refractive index component is selected and used in an amount such that the overall refractive index of the encapsulant is below that of the electrolyte in a self-assembled electrochemical device. In some embodiments, the length-scales of any phases formed by the conductive and low refractive index components are very small, e.g., about 0.25 μm or less, and in some instances about 0.1 μm or less, for example, less than about 0.05 μm, or less than about 0.01 μm. In certain embodiments, the conductive and low refractive index components are linked, i.e., connected by covalent or ionic bonding to form part of a single polymer.

In some embodiments, an encapsulant material includes one or more conductive polymers (CPs) that have been modified to include moieties of low refractive index. Those skilled in the art will appreciate that CPs as described herein include without limitation those polymers sometimes referred to in the art as "intrinsically conductive polymers" (ICPs). Modification of a CP to include moieties of low refractive index decreases the refractive index of the modified CP so that it is lower than the refractive index of the electrolyte phase to be used in a given self-assembled electrochemical device. A CP is modified, for example, by covalently or ionically attaching one or more moieties of low refractive index to the polymer. Thus, the encapsulating polymer can be a conductive polymer whose pendant groups include low refractive index moieties. Suitable conductive polymers include, without limitation, polyanilines, polypyrroles, polyacetylenes, polyphenylenes, polythiophenes, polyalkylenedioxythiophenes, derivatives thereof, combinations thereof, and the like. Suitable moieties of low refractive index include, without limitation, fluorinated groups, such as the fluorinated alkyl and aryl groups discussed in more detail below.

In some instances, modification is carried out on the relevant monomers before polymerization. Alternatively, modification is performed on the resultant polymer after polymerization. Non-limiting examples of monomers suitable for forming conductive polymers include thiophene (Th), bithiophene (BiTh) or other higher order thiophenes, ethylenedioxythiophene (EDOT), propylenedioxythiophene (PrODOT) or other alkylenedioxythiophenes, anilines, pyrroles, and combinations thereof. In some embodiments, a conductive polymer (or corresponding monomer) is modified by the addition of a fluorinated group, such as a perfluoroalkyl or perfluoroaryl group, pendant to or incorporated within the polymer backbone. The perfluoroalkyl groups can be linear, branched, or a combination thereof. The perfluoroalkyl or perfluoroaryl groups are attached to the polymer backbone in a regioregular or non-regioregular fashion, or a combination thereof. The perfluoroalkyl or perfluoroaryl groups are fully fluorinated or partially fluorinated. The perfluoroalkyl or perfluoroaryl groups are attached to the backbone at carbon or heteroatom sites (e.g., the nitrogen atom in a pyrrole or aniline-based polymer). Suitable linkages for attaching the perfluoroalkyl or perfluoroaryl groups include, but are not limited to, alkyl, ether, thioether, ester, thioester, amine, amide, and benzylic linkages.

Structures I-V are non-limiting examples of suitable modified thiophene, alkoxythiophene and pyrrole-based monomers.

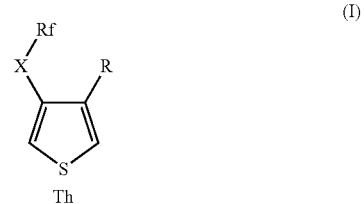

Th

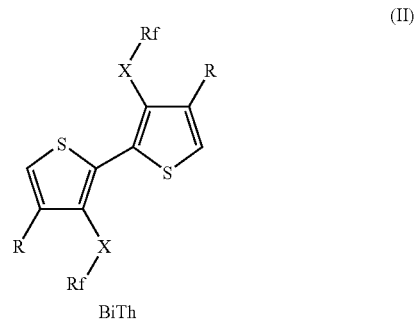

BiTh

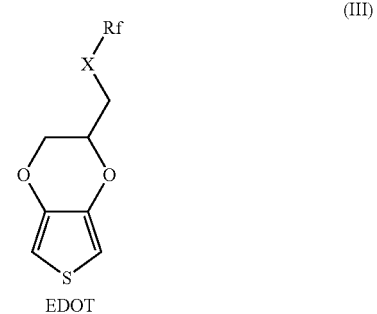

EDOT

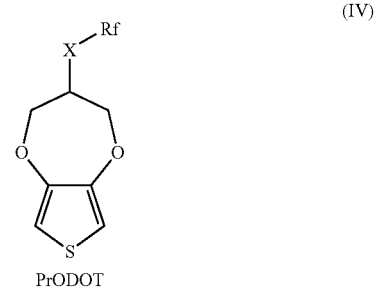

PrODOT

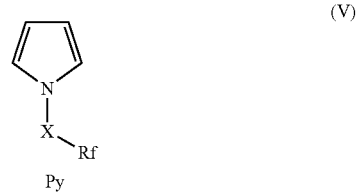

Py

Structures I-V are based on the structures of, respectively, thiophene (Th), bithiophene (BiTh), ethylenedioxythiophene (EDOT), propylenedioxythiophene (PrODOT) and pyrrole (Py). X is a linking group that attaches a fluorinated moiety to the backbone structure. X is chosen to provide the necessary linking function without adversely affecting the desired properties of refractive index and conductivity of the material. Non-limiting examples of suitable X groups include alkyl, ether, thioether, ester, thioester, amine, amide, and benzylic linkages. Rf is a fluorinated alkyl or aryl group or combination thereof. R is a variable pendant group including, but not limited to, an X-Rf moiety (with X and Rf defined as described above), $C_1$-$C_{15}$ alkyl, or H.

Several examples of fluorinated polythiophene and poly-EDOT polymers have been reported in the literature (for different purposes than described herein). Examples of fluorinated polythiophenes are described by El Kassmi et al., *J. Mol. Cat.* 72:299-305 (1992); El Kassmi et al., *J. Electroanal. Chem.* 326:357-362 (1992); Robitaille et al., *Macromolecules* 27:1847-1851(1994); Middlecoff et al., *Synth. Met.* 84:221-222 (1997); and Hong et al., *Macromolecules* 32:4232-4239 (1999). An example of a fluorinated poly-EDOT is reported by Schwendeman et al., *Adv. Funct. Mater* 13:541-5417 (2003).

An example of a fluorinated polypyrrole is reported by Ho-Hoang et al., *J. Mater. Chem.* 6:1107-1112 (1996).

In one or more embodiments, encapsulant materials include copolymers of CPs and low refractive-index polymers (LRIPs). Exemplary copolymers include the following:

CP-graft-LRIP having a CP backbone that has been modified so that LRIP can be grown in a second step as side chains (grafts);

LRIP-graft-CP having an LRIP backbone that has been modified so that CP can be grown in a second step as side chains (grafts); and CP-block-LRIP having a CP that is attached at one or both ends of the polymer chain to an LRIP, which itself may be attached at one or both ends to a CP segment. One skilled in the art will appreciate that the CP is generally present in blocks of at least about 8 repeating monomer units in order for polymer-like conductivity to be achieved.

Suitable CPs include, without limitation, polyanilines, polypyrroles, polyacetylenes, polyphenylenes, polythiophenes, polyethylenedioxythiophenes, derivatives thereof, and the like. Suitable LRIPs include, without limitation, fluorinated polymers such as poly(fluoroalkyl)acrylates, poly(fluoroalkyl)methacrylates, fluorinated polyolefins, poly(perfluoroalkylvinylethers), and their copolymers, terpolymers, and the like.

In one or more embodiments, an encapsulant material includes a conductive polymer having an ionic and/or electronic conductivity sufficient for use in a self-assembled battery system, e.g., an ionic conductivity of at least about $10^{-7}$ S/cm and/or an electronic conductivity of at least about $10^{-2}$ S/Cm, in some instances at least about $10^{-1}$ S/cm, or at least about 1 S/cm. In some embodiments, the polymer is modified to increase the ionic conductivity of the polymer. For example, moieties capable of transporting ions are chemically attached to a CP (e.g., in the same way as described above for perfluoroalkyl or perfluoroaryl groups), so that the material has sufficient ionic conductivity for self-assembled electrochemical device performance. Suitable groups that enhance ionic conductivity include, without limitation, oxygen- or sulfur-containing moieties, e.g., thioalkyl and oxyalkyl groups, e.g., variable-length ethyleneoxide chains (—$CH_2CH_2O$—) and crown ethers. In certain embodiments, additional components are added to an encapsulant material to increase the ionic and/or electronic conductivity of the coating. By way of non-limiting example, in some instances polyethylene oxide or carbon black is added.

In certain embodiments, encapsulant materials include homogeneous, non-particulate blends of soluble CPs (or modified CPs as described above) with soluble polymers of low refractive index, such as, for example, polytetrafluoroethylene, poly(fluoroalkyl)acrylates, poly(fluoroalkyl)methacrylates, or Teflon® AF (DuPont, amorphous fluoropolymers). In such embodiments, polymers used together are co-soluble in a common solvent, and are essentially miscible in the final encapsulant film. This allows for the maintenance of low lengthscales of phase separation of conductive and low refractive index domains. For example, in at least some instances the conductive and low refractive index components do not form phases with lengthscales larger than about 0.25 μm, and in some cases do not form phases with lengthscales larger than about 0.1 μm, about 0.05 μm, or about 0.01 μm. In some instances, a homogeneous blend includes linear elements of each phase that are twisted, intertwined, or entangled on a lengthscale in between the width and the length of the linear elements. For example, a strand 10 Angstroms wide and 1,000 Angstroms long is twisted, intertwined, or entangled on a lengthscale of 10 to 1,000 Angstroms. Electroactive particles encapsulated with such homogeneous polymer blends function well in forming the electrodes of self-assembled electrochemical devices, because the uniform van der Waal's energetics afforded by the homogenous polymer blend coating provide the desired combination of attractive and repulsive forces to form electrodes with good inter-particle connections and avoid internal shorts. In some instances, blends are made by mixing preformed polymers. Alternatively, the monomer of one polymer is polymerized in the presence of another preformed polymer at the surface of an active particle.

Figure 3:
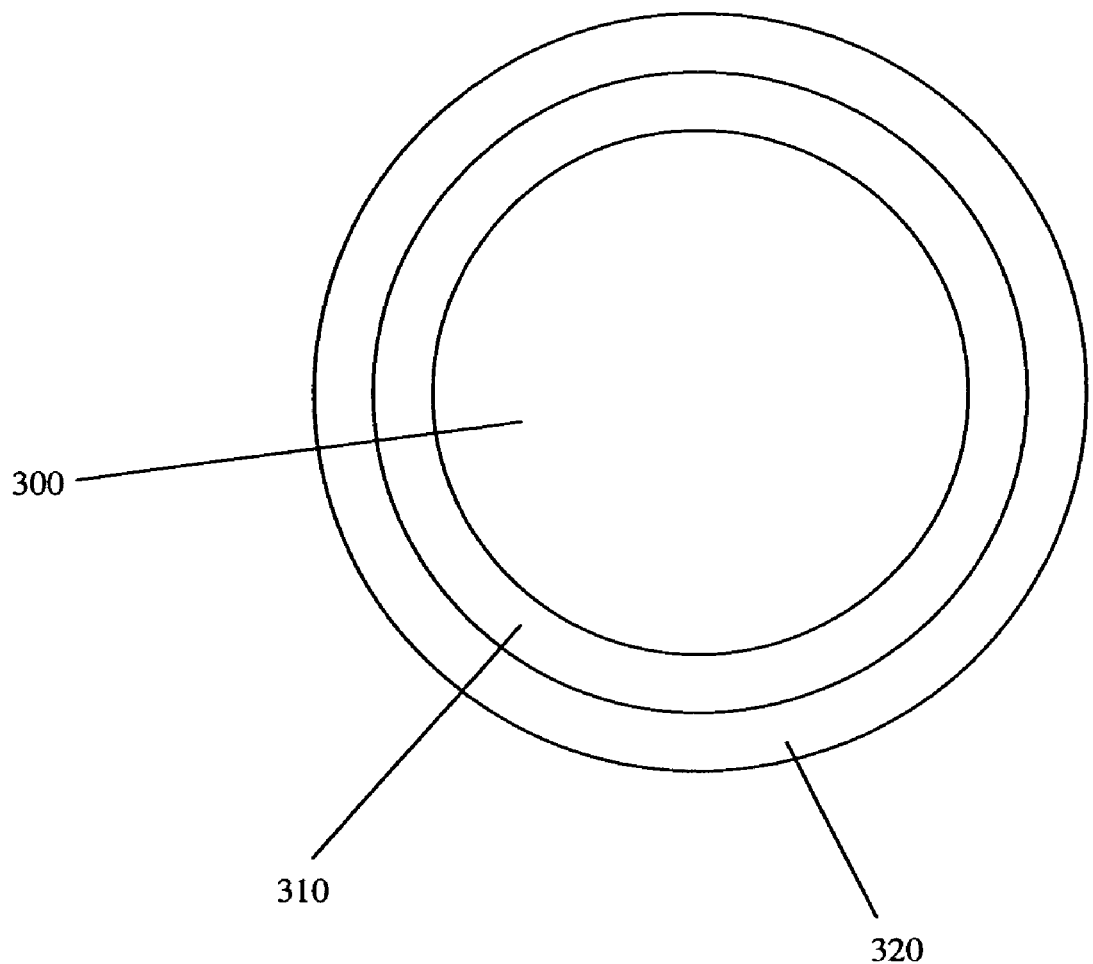

In some embodiments, an encapsulant material includes a first layer of a conductive material and a second layer of a low refractive index material that is optionally also conductive. FIG. 3 illustrates an electroactive particle 300 coated with a first layer (underlayer) 310 of a conductive material, and a second layer (overlayer) 320 of a low refractive index material. In some instances, the layer 320 of low refractive index material also includes a conductive component. In other instances, the layer 320 of low refractive index material is not conductive. Non-limiting examples of suitable materials for use in the layer 310 of conductive material include, without limitation, polyanilines, polypyrroles, polyacetylenes, polyphenylenes, polythiophenes, polyalkylenedioxythiophenes, derivatives thereof, and combinations thereof. Non-limiting examples of suitable materials for use in the layer 320 of low refractive index material include, without limitation, polytetrafluoroethylene, poly(fluoroalkyl)acrylates, poly(fluoroalkyl)methacrylates, amorphous fluoropolymers, derivatives thereof, and combinations thereof. Further non-limiting examples of low refractive index materials include aerogels and other nanoporous materials, foams or other highly porous structures, nanoporous silica coatings, various other spin-on-glass materials, and sodium aluminum fluoride. Each of the layers 310, 320 is typically made as thin as possible (depending, e.g., on the method by which the layer is deposited and the layer material itself), in at least some instances representing less than about 10 vol. % of the particle, for example, less than about 5 vol. % of the particle, less than about 2 vol. % of the particle, or less than about 1 vol. % of the particle. In some instances, the thickness of each layer 310, 320 is about 0.2 μm or less, for example, about 0.1 μm or less.

Some alternative embodiments provide for encapsulation of particles with low refractive index, ionically conductive materials that are not themselves electronically conducting, but are bound to the particle surface loosely enough to be mobile across the surface. Non-limiting examples of such materials include surfactants and other substances that are electrostatically attracted, but not covalently bound, to the particle surface. Useful surfactants include, without limitation, fluoroalkyl based surfactants having anionic or cationic headgroups, e.g., Zonyl® fluorosurfactants (DuPont). Such electrostatically attracted materials can move away from the particle surface when the particle approaches another material to which it is more strongly attracted. For example, as encapsulated particles approach one another, the low refractive index material is able to move out of the way so that the bare surfaces of the approaching particles can make contact. In at least some such embodiments, the particles have been coated first with an electronically conductive material (e.g., a metal, a CP, or a conductive oxide such as indium tin oxide). Then as the mobile low refractive index encapsulant moves away from the areas of closest approach of the particles, the conductive surfaces of the particles touch to form an electronically connected electrode. The low refractive index of the mobile coating allows only like particles to connect, and repels particles having a higher refractive index than the electrolyte medium of the relevant self-assembled electrochemical device. The mobile coating is therefore also chosen to be insoluble in the electrolyte medium.

The encapsulant materials described herein are also useful for coating current collectors of electrochemical devices. For example, in certain embodiments, a self-assembled electrochemical device has at least one electrode made up of electroactive particles coated with an encapsulant material. As described above, the electrode particles can be wired to the corresponding current collector (i.e., anode particles wired to anode current collector and cathode particles wired to cathode current collector) in the electrochemical device through the operation of attractive forces between the electrode particles and the corresponding current collector, and repulsive forces between the electrode particles and the opposing current collector. Wiring the coated electrode particles to the corresponding current collector is facilitated by coating that current collector with the same encapsulant material as the electrode particles. That is, wiring anode particles to the anode current collector is facilitated by applying the same coating to the anode particles and the anode current collector, and wiring cathode particles to the cathode current collector is facilitated by applying the same coating to the cathode particles and the cathode current collector. As a non-limiting example, in some embodiments, one current collector is coated with an encapsulant material having a conductive component and a low refractive index component (e.g., in the form of a single polymer, a homogeneous blend, or sequential layers as described above), which attracts and thus facilitates wiring to low refractive index electroactive materials (e.g., similarly-encapsulated $LiCoO_2$ particles), and which repels high refractive index active materials (e.g., mesocarbon microbeads). The opposing current collector is chosen to have a high refractive index (e.g., pure copper), which has the opposite attracting and repelling effects.

Another aspect provides encapsulation methods. An encapsulant material is applied as a thin layer on the surface of a particle. In some instances, the encapsulant layer is applied using spray drying or other vaporization/deposition techniques. Non-particulate polymer blends are useful for deposition in this manner. In some instances, an encapsulant material film is formed by polymerization of appropriate monomers at the surface of an active particle. The particle surface is modified as needed to support the chemical reaction, so that the polymer is grown directly from or on the active particle surface. By way of non-limiting example, in certain embodiments the particle surface is modified using surfactants (e.g., to cause a growing polar polymer to associate with a non-polar surface, or to cause a growing non-polar polymer to associate with a polar surface), silane groups covalently bound to the particle surface, and/or variation of the pH at the particle surface (e.g., by placing the particle in solution and adding an acid or base, for example, to deprotonate surface moieties on the particle).

In some embodiments, the polymer is grown into a continuous shell on the surface of the electroactive particle. The continuous shell is formed by polymers that are not directly bound to the particle surface, and instead are bound only to each other in a network-like fashion to form a blanket-like shell around the particle. The monomers and/or growing polymers associate with the particle through electrostatic interactions, such that the growing polymer is in close proximity to allow for polymerization into a continuous shell.

In at least some embodiments, polymerization is carried out in a solvent, and deposition of polymeric material occurs when the growing polymer precipitates due to a loss of solubility in the solvent. Non-limiting examples of suitable solvents include methanol, ethanol, chloroform, acetone, water, acetonitrile, ethyl acetate, methylene chloride, and combinations thereof. If the particles to be coated are present in the solvent during polymerization, then polymer deposition occurs at the particle surface. In general, polymers such as, for example, those based on thiophenes, alkoxythiophenes, anilines, and pyrroles, are grown in a stepwise manner from monomers that are oxidized in situ by an oxidant. Suitable oxidants include, without limitation, $Fe^{3+}$ oxidants such as $FeCl_3$, $Fe(ClO_4)_3$, $Fe(NO_3)_3$, and $Fe(tos)_3$ (tos is tosylate), and $(NH_4)_2S_2O_8$. The desired coating thickness is achieved by adjusting one or more polymerization parameters such as, for example, the ratio of active particle surface to the amount of polymerizing material, monomer and/or particle concentration, polymerization time, choice of oxidant, oxidant concentration, polymerization temperature, and choice of solvent.

In some embodiments, an electroactive particle is sequentially coated with a layer of a conductive material followed by a layer of a low refractive index material that is optionally also conductive.

The following non-limiting examples further illustrate certain embodiments. The publications cited in the examples are incorporated herein by reference.

EXAMPLE 1

This example describes the synthesis of fluorinated thiophene monomers. Most of the development work was done with fluoroalkylthiophene ethers such as 3-pentadecafluorooctyloxythiophene (Th-O-1,7) (Structure VI) and the structurally similar 3-methyl-4-pentadecafluorooctyloxythiophene (Me-Th-O-1,7) (Structure VII).

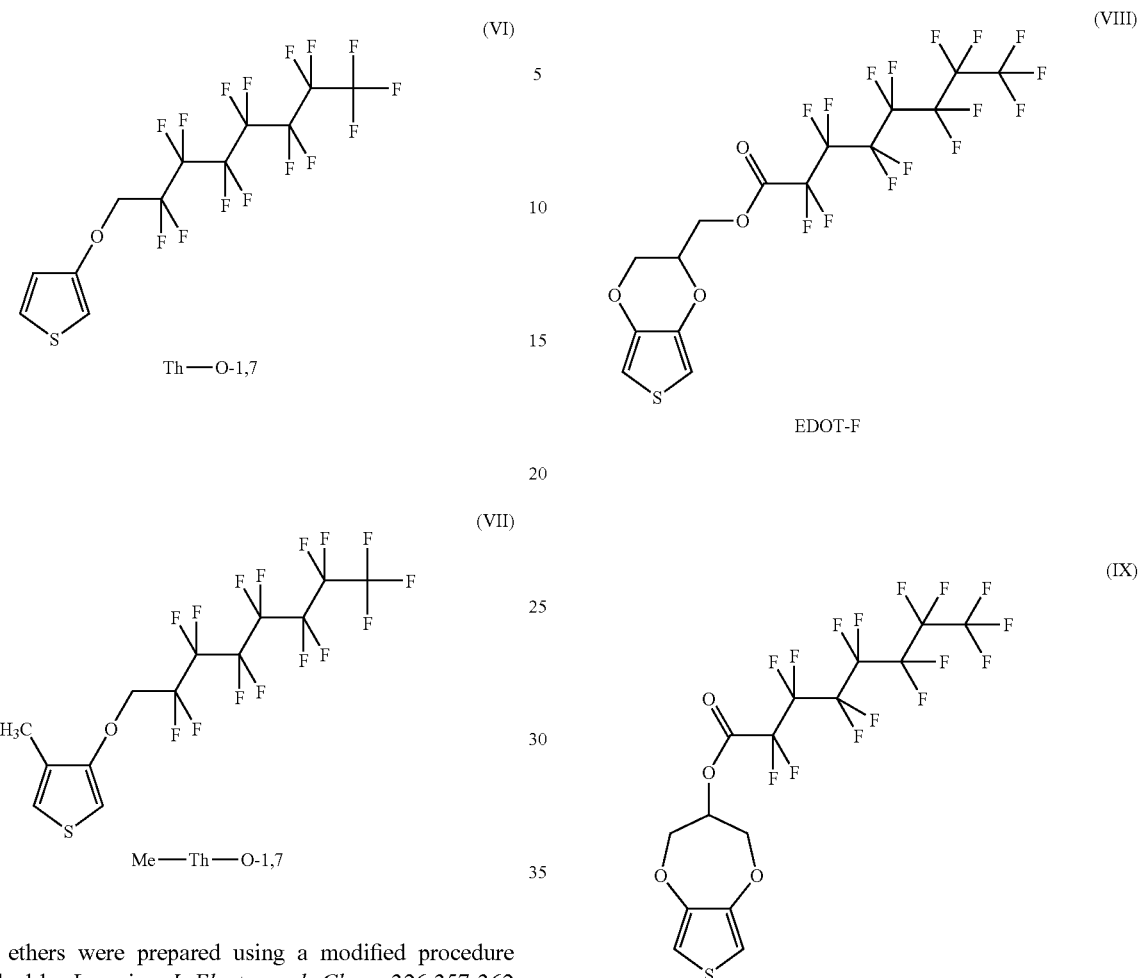

These ethers were prepared using a modified procedure published by Lemaire, *J. Electroanal. Chem.* 326:357-362 (1992), as illustrated here for Th-O-1,7. In a glove box, 0.72 g NaH was added to a 250 mL three-neck round bottomed flask. 10 g of 2,2,3,3,4,4,5,5,6,6,7,7,8,8,8-pentadecafluorooctan-1-ol and 10 g of ethyleneglycoldimethylether were mixed and added to the NaH. The mixture was stirred for 20 min. 7.4 g of 3-bromothiophene was added, followed by 2.34 g of CuI. The flask was removed from the glove box, fitted with a reflux condenser and an inert gas (nitrogen or argon) inlet, and then heated to reflux (~95° C.) with stirring for 15 h. The product was isolated using vacuum distillation using a vigreux column.

EXAMPLE 2

This example describes the synthesis of fluorinated ethylenedioxythiophene monomers, pentadecafluoro octanoic acid 2,3-dihydro-thieno[3,4-b][1,4]dioxin-2-ylmethyl ester (EDOT-F), and the PrODOT-F analog. EDOT-F (monomer Structure VIII) and PrODOT-F (monomer Structure IX) were synthesized following the procedures disclosed by Lima et al., *Synth. Met.* 93:33-41 (1998) (method for making EDOT-MeOH, a precursor to EDOT-F) and Schwendeman et al., *Adv. Funct. Mater.* 13:541-5417 (2003) (method for synthesizing and purifying EDOT-F from EDOT-MeOH).

EXAMPLE 3

This example describes polymerization of the fluorinated monomers Th-O-1,7, Me-Th-O-1,7, EDOT-F, and PrODOT-F.

A. Chemical Polymerization

A typical chemical polymerization for the thiophene-based monomers, Th-O-1,7 and Me-Th-O-1,7, was performed by oxidative coupling of the fluorinated thiophene monomer by FeCl$_3$ as described by Lemaire, *J. Electroanal. Chem.* 326:357-362 (1992), and illustrated here for the Th-O-1,7 monomer. To a 3-neck round bottomed flask were added 2.25 g of anhydrous FeCl$_3$ and 50 mL of dry CHCl$_3$. 1.68 g of Th-O-1,7 was dissolved in 16.8 g CHCl$_3$ and added dropwise to the stirred FeCl$_3$/chloroform slurry over 10 min. at room temperature. The reaction was allowed to proceed for 2 h., after which the product powder was filtered and extracted overnight using chloroform in a soxhlet apparatus, and then dried in vacuo overnight. Alternatively, the FeCl$_3$ slurry can be added slowly to the monomer solution at room temperature.

A typical chemical polymerization for the alkylenedioxythiophene-based monomers, EDOT-F and PrODOT-F, was performed by oxidative coupling by Fe(tos)$_3$, as illustrated here for EDOT-F. To a one-neck round bottom flask equipped with a reflux condenser and argon inlet were added 1.79 g of Fe(tos)$_3$.6H$_2$O and 20 mL of CHCl$_3$. The reaction was heated to 50° C. and allowed to stir for one hour under positive argon pressure. In a separate vessel, 1.0 g of EDOT-F was dissolved in 2.0 mL of CHCl$_3$. With a syringe, the EDOT-F/CHCl$_3$ solution was added in one portion, and the polymerization was allowed to proceed at 50° C. for 24 h. The reaction was cooled to room temperature, the stir bar was removed, and the reaction mixture was poured into a 250 mL plastic bottle. About 100 mL of CHCl$_3$ was added, and the mixture was centrifuged at 3000 rpm for about 20 min. The CHCl$_3$ was decanted, and the remaining blue-black residue was washed with 150 mL methanol, centrifuged at 3000 rpm for 20 min., and then decanted. The residue was then washed with 150 mL of deionized water, and centrifuged at 3000 rpm for 20 min. This washing procedure was performed twice more with deionized water. The residue was then washed with methanol again and centrifuged at 3000 rpm for 20 min. This was repeated twice more. The residue was then allowed to dry overnight in air, followed by drying under vacuum overnight.

B. Electrochemical Polymerization

A typical electrochemical polymerization was performed in a one compartment, two-electrode electropolymerization cell with a working electrode made from gold-coated glass and a platinum counter electrode. For Me-Th-O-1,7 and Th-O-1,7 monomers, the polymerization solution was prepared in a dry box and contained 0.1 M tetrabutylammonium hexafluorophosphate and 0.1 M fluorothiophene monomer in nitrobenzene. The polymerization was carried out by passing 1.3 mA/cm$^2$ for 15 min. to leave a film on the gold electrode. The film was washed by rinsing in nitromethane to remove salt, and then dried in a fume hood for 1 hour. For EDOT-F and PrODOT-F monomers, the polymerization solution was prepared in a dry box and contained 0.1 M tetrabutylammonium hexafluorophosphate and 0.01 M fluoronated monomer in propylene carbonate. The polymerization was carried out by passing 0.04 mA/cm$^2$ for one hour to leave a film on the gold electrode. The film was washed by rinsing in propylene carbonate followed by methanol to remove salt, and then dried in a fume hood for 1 hour.

EXAMPLE 4

This example describes conductivity measurements of the fluorothiophene polymers.

A. Pressed Pellets

Conductivities were measured using a 4-point probe technique. For the chemically polymerized materials, pressed pellets were used for determining conductivity. 0.25 g of washed and dried polymer powder was pressed at 5 tonnes for 30 seconds between stainless steel plungers having a cross-sectional area of about 1 cm$^2$. The pellets were removed, and a four-point in-line probe was placed in the middle of the pellet surface. Conductivity (σ) was calculated from resistance (R), after measuring the pellet thickness (t), and interelectrode spacing (d), using the following Equation 1.

$$\sigma = \frac{1}{Rt\pi} \ln\left(2 \frac{\left(\frac{d}{s}\right)^2 + 3}{\left(\frac{d}{s}\right)^2 - 3}\right) \quad (1)$$

B. Electrochemically Prepared Films

The dry films were removed from the gold electrodes using adhesive tape. Conductivities were determined using the van der Pauw method (van der Pauw, *Philips Research Report*, 13(1) (1958)).

C. Conductivity Results

Pressed pellet conductivities for the poly(Th-O-1,7) were between 0.02 S/cm and 0.05 S/cm. The conductivities of the poly(Me-Th-O-1,7) electropolymerized films were as high as 4 S/cm, but were routinely about 0.05 S/cm. Pressed pellet conductivities for poly(EDOT-F) were between 0.01 S/cm and 1 S/cm. Electropolymerized poly(EDOT-F) and poly(PrODOT-F) conductivities were as high as 75 S/cm, but were routinely about 50 S/cm.

EXAMPLE 5

This example addresses the repulsive character of poly (Me-Th-O-1,7) and poly(EDOT-F). For these polymers to be useful as encapsulants for LCO and other cathode materials in a self-assembled battery system cell, they should exhibit a repulsive van der Waal's force towards particles of a potential anode material such as, for example, mesocarbon microbeads (MCMB). The repulsive nature of poly(Me-Th-O-1,7) and poly(EDOT-F) was demonstrated by the following experiment.

A. Repulsion Experiment

Figure 4:
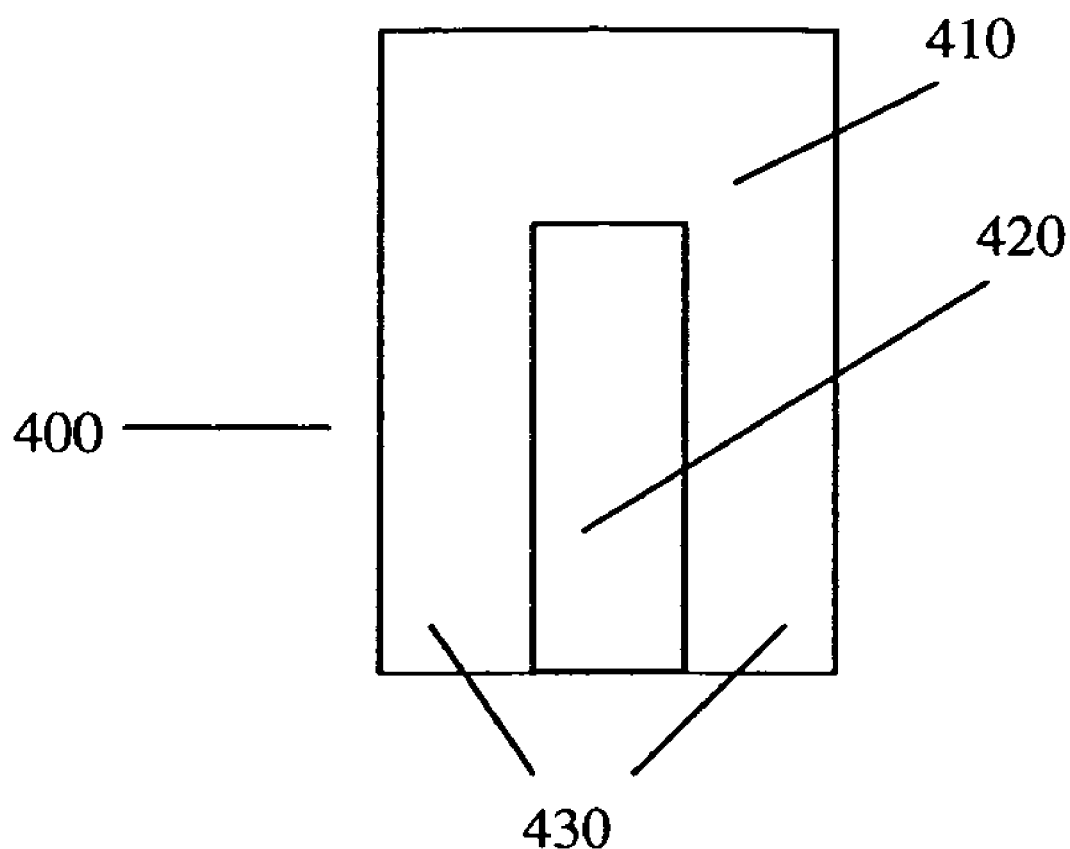
FIG. 4 is a schematic illustration of an electrode used in repulsion experiments to evaluate encapsulant materials according to certain embodiments.

A film of poly(Me-Th-O-1,7) was deposited by electrochemical polymerization (1.3 mA/cm$^2$, 15 min., 0.1 M tetrabutylammoniumhexafluorophosphate, nitrobenzene, 0.1 M Me-Th-O-1,7, room temperature). A film of poly (EDOT-F) was deposited by electrochemical polymerization (0.04 mA/cm$^2$, 15 min., 0.1 M tetrabutylammoniumhexafluorophosphate, propylenecarbonate, 0.01 M EDOT-F, room temperature). The working electrode was a glass slide that had been coated with chromium followed by gold (the chromium assists with adhesion of the gold). FIG. 4 illustrates the electrode 400, with evaporated gold 410 and exposed glass 420 portions. The electrode 400 was placed into the polymerization solution so that only the lower part of the electrode was immersed. During polymerization, two polymer films were formed—one on each gold "leg" 430 of the electrode 400. For poly(Me-Th-O-1,7), the coated electrode was washed in nitrobenzene, then m-xylene. For poly(EDOT-F), the coated electrode was washed in propylene carbonate followed by m-xylene. The two gold legs 430 were then electrically disconnected by scribing through the gold coating at the top of the electrode. Van der Waal's repulsion to MCMB was then demonstrated by laying the electrode horizontal, and measuring the electrical resistance (by AC impedance) between the 2 gold pads when covered with a droplet of a 40% slurry of MCMB in m-xylene.

Since the MCMB/xylene slurry employed is electrically conductive, a low resistance measured across the gold pads would indicate that the MCMB was making electrical contact with the fluorinated polymer film, which would suggest a lack of van der Waal's repulsion. A high resistance measured between the gold pads would indicate that the MCMB was not making electrical contact with the fluorinated polymer film on each leg, which would suggest that van der Waal's repulsion was preventing the carbon near the film from touching the film, and there was a layer of m-xylene between the film and the MCMB particles. Low resistance values would be expected when repeating the experiment using electrodes with no fluoropolymer coating on the gold, as there should be no (or low) repulsive van der Waal's forces between MCMB and gold. Thus, a large difference in the resistances of a polymer-coated electrode and a bare gold electrode would be attributed to the resistance of the m-xylene layer between the fluoropolymer and the MCMB particles being repelled from it.

B. Results of Repulsion Testing

With non-coated gold electrodes, the resistance between the two gold pads was 10 k$\Omega$, and remained at this value until the slurry dried out, at which time the resistance dropped to 20$\Omega$. The same experiment using electrodes coated with poly(Me-Th-O-1,7) had an initial resistance of 100 k$\Omega$ that dropped to about 100$\Omega$ as the slurry dried (the MCMB is not repelled from the fluoropolymer film in air, only in liquids whose refractive index lies between that of the MCMB and the fluoropolymer). For poly(EDOT-F)-coated electrodes, the initial resistance was 200 k$\Omega$, and dropped to approximately 100$\Omega$ as the slurry dried.

These observations established that the MCMB particles were repelled from the fluoropolymer coatings, and that the resistance of the m-xylene between the MCMB particle-pack and the fluoropolymer films was around 90 k$\Omega$ to 180 k$\Omega$. Using a resistivity for m-xylene of $10^{10}$ $\Omega$ cm (a reasonable value given that the solvent was contaminated by the MCMB and thus would have a lower resistivity than pure m-xylene), a separation of the MCMB pack from the fluoropolymer films of ~100 nm was calculated. This crude calculation provided an indication of the lengthscales of separation involved when using van der Waal's repulsion to separate MCMB from fluoropolymer films.

The following examples describe methods of encapsulating particles such as lithium cobalt oxide (LCO) and lithium nickel manganese oxide (LNMO).

EXAMPLE 6

This example demonstrates encapsulation with a highly fluorinated polythiophene encapsulant. An encapsulant was prepared by the polymerization of a modified thiophene monomer in the presence of cathode particles. Specifically, LNMO was encapsulated with poly(EDOT-F). To a 100 mL round bottom flask equipped with a magnetic stir bar, reflux condenser, and argon inlet was added 1.0 g of EDOT-F, 1.5 g of LNMO, and 40 mL of CH$_3$CN. The LNMO particle size was in the range of 2 µm to 10 µm. The mixture was heated to 65° C. and rapidly stirred for one hour under argon. To the stirring solution was added 2.39 g of Fe(tos)$_3$.6H$_2$O in one portion, and the reaction mixture was stirred for 24 h. The reaction was cooled to room temperature, the stir bar was removed, and the reaction mixture was poured into a 250 mL plastic bottle. About 100 mL of CHCl$_3$ was added, and the mixture was centrifuged at 3000 rpm for 20 min. The CH$_3$CN was decanted, and the remaining blue-black residue was washed with 150 mL of deionized water, centrifuged at 3000 rpm for 20 min., and decanted. This washing procedure was performed twice more with deionized water. The residue was then washed with 150 mL of methanol, centrifuged at 3000 rpm for 20 min., and then decanted. This procedure was repeated twice more with methanol. The residue was then allowed to dry overnight in air, followed by drying under vacuum for 24 h. Pressed pellet conductivities were observed as high as 0.1 S/cm of partially coated LNMO particles, and typically were in the range of $10^{-5}$ to $10^{-1}$ S/cm. The above reaction was repeated with the oxidants Fe(ClO$_4$)$_3$.9H$_2$O, FeCl$_3$, and Fe(NO$_3$)$_3$.9H$_2$O.

EXAMPLE 7

This example demonstrates encapsulation using a first layer of a highly conducting polymer followed by a second layer of a lesser conducting, fluorinated polymer. For most conducting polymers, when non-conducting groups such as alkyl or fluoroalkyl groups are appended to the backbone, the conductivity of the polymer decreases. This decrease in conductivity is due to dilution of the conductive portion of the polymer, and decrease in interpolymer interactions. To enhance the conductivity of a fluorinated conducting polymer on the surface of cathode particles, and to aid in the encapsulation of the fluorinated polymer via a "seed" layer, a non-fluorinated and highly conducting similar polymer was first deposited onto the cathode particle surface.

To a 100 mL round bottom flask equipped with a magnetic stir bar, reflux condenser, and argon inlet was added 3 g of LNMO, 9.49 g of Fe(tos)$_3$.6H$_2$O (2 eq.), and 30 mL of deionized H$_2$O. The mixture was heated to 85° C., and rapidly stirred for one hour under argon. A mixture of 1.0 g of EDOT and 1 mL of methanol was prepared and added in one portion via syringe to the rapidly stirring mixture and stirred for 24 h. This method was similar to that found in Khan et al., *Langmuir* 15:3469-3475 (1999). The reaction was cooled to room temperature, the stir bar was removed, and the reaction mixture was poured into a 250 mL plastic bottle. About 100 mL of deionized water was added, and the mixture was centrifuged at 3000 rpm for 20 min. The water was decanted, and this procedure was performed twice more with deionized water. The residue was then washed with 150 mL of methanol, centrifuged at 3000 rpm for 20 min., and then decanted. This procedure was repeated twice more with methanol. The residue was then allowed to dry overnight in air, followed by drying under vacuum for 24 h. Pressed pellet conductivities of the EDOT-coated LNMO particles exhibited highs of 20 S/cm, and were typically in the range of 1-15 S/cm, and a poly(EDOT) coating thickness of 0.5 µm to 1 µm was observed. The thickness and conductivity can be increased by increasing the amount of EDOT monomer and oxidant in the same ratio.

The EDOT-coated LNMO composite was then ground with a mortar and pestle and placed in a one-neck round bottom flask equipped with a stir bar, reflux condenser, and argon inlet. To the flask was added 1.5 g of EDOT-F and 40 mL of CH$_3$CN. The mixture was heated to 65° C., and rapidly stirred for one hour under argon. To the stirring mixture was added 2.68 g of Fe(tos)$_3$.6H$_2$O (Fe(ClO$_4$)$_3$.9H$_2$O can also be used), and the mixture was stirred for 24 h. The reaction was cooled to room temperature, the stir bar was removed, and the reaction mixture was poured into a 250 mL plastic bottle. About 100 mL of deionized water was added, and the mixture was centrifuged at 3000 rpm for 20 min. The water was decanted, and the procedure was performed twice more with deionized water. The residue was then washed with 150 mL of methanol, centrifuged at 3000 rpm for 20 min., and then decanted. This procedure was repeated twice more with methanol. The residue was then allowed to dry overnight in air, followed by drying under vacuum for 24 h. Pressed pellet conductivities for the LNMO-poly(PEDOT)-poly(PEDOT-F) composites were as high as 3 S/cm, and were typically in the range of 0.1-1 S/cm.

EXAMPLE 8

This example demonstrates encapsulation with a blend of CP and LRIP. An encapsulant was prepared from a blend of poly(3-octylthiophene) (polyalkylenedioxythiophenes can also be used) and poly(hexafluoroisopropylmethacrylate) (a low refractive index polymer that has been shown to repel glassy carbon beads in m-xylene by AFM force spectroscopy) in tetrahydrofuran (THF), a common solvent for the two polymers. This solution was sprayed onto grains of LCO in a fluidized bed where, on loss of THF, a thin encapsulant film was formed. Thin films of spin cast blends of poly(3-octylthiophene) in poly(hexafluoroisopropylmethacrylate) had conductivities around 1 S/cm, and can have refractive indices (calculated from the rule of mixtures) below that of typical solid polymer electrolytes. Improved ionic conductivity can be achieved by adding small amounts of polyethylene oxide (PEO, a good ion transporting polymer) to the encapsulant solution before spray coating. The encapsulant conductivity can be improved using the methods described in Example 6, such as doping with $Fe^{3+}$-based oxidants such as $Fe(tos)_3.6H_2O$.

EXAMPLE 9

This example demonstrates encapsulation with a copolymer of polythiophene or polyalkylenedioxythiophene bearing poly(hexafluoroisopropylmethacrylate) grafts. A copolymer was prepared with a polythiophene backbone that was then treated such that the LRIP, poly(hexafluoroisopropylmethacrylate), could be grown in a second polymerization step to form a graft co-polymer. 3-Thiophene-2-ethanol was reacted with methacryloylchloride in pyridine/chloroform to form 3-methacryloyl thiophene (M-Th), a thiophene monomer with a methacrylate side group. This was then mixed with thiophene and $FeCl_3$ in THF, and stirred for 6 hours to generate a poly(thiophene) having methacrylate groups on some of the thiophene repeat units. This polymer was isolated by repeated precipitation in methanol followed by solvation in THF, and then mixed in THF with hexafluoroisopropylmethacrylate monomer that had been freed from inhibitor on a basic alumina column, along with azobisisobutyronitrile (AIBN, 1 mol % based on hexafluoroisopropylmethacrylate). The mixture was purged of oxygen and heated to 65° C. for 12 hours to polymerize the hexafluoroisoropylmethacrylate, forming low refractive index grafts from the polythiophene backbone. A solution of this polymer was then sprayed onto the grains of LCO in a fluidized bed. The encapsulant can be rendered conductive (i) in solution before spraying by mixing iodine into the solution, or (ii) after spraying by exposing the encapsulated particles to iodine vapor or a solution of $FeCl_3$ in, for example, nitromethane.

EXAMPLE 10

This example demonstrates encapsulation with a copolymer of poly(hexafluoroisopropylmethacrylate) bearing polythiophene or polyalkylenedioxythiophene grafts. A copolymer was prepared with a poly(isopropylmethacrylate) backbone such that polythiophene, or poly(substituted-thiophene)s (such as polyalkylenedioxythiophenes) could be grown in a second step.

The same monomer as was used in Example 9 was prepared. This time the vinyl polymerization was carried out first. The monomer M-Th was mixed with hexafluoroisopropylmethacrylate in THF and 1 mol % AIBN. After removal of oxygen, the mixture was heated to 65° C. for 12 hours to polymerize the hexafluoroisopropyl methacrylate/M-Th mixture, resulting in a poly(hexafluoroisoropyl-methacrylate) polymer with thiophene side groups on some of the repeat units. After isolation of the polymer, the thiophene side groups were converted to polythiophene side groups by reaction with thiophene monomer (a substituted thiophene monomer can be used, e.g., EDOT-F) and $FeCl_3$ (or other $Fe^{3+}$-based oxidant) in THF for 4 hours. Reaction was initiated at the thiophene side groups of the polymer, as their oxidation potential is lower than that of the thiophene monomer in solution due to their attachment at the 3-position to the poly(hexafluoroisopropylmethacrylate) backbone. A solution of this polymer can be sprayed on grains of LCO in a fluidized bed with loss of solvent.

EXAMPLE 11

This prophetic example demonstrates encapsulation with a copolymer of polythiophene and/or polyalkylenedioxythiophenes with poly(hexafluoroisopropylmethacrylate) grafts, by LCO surface-directed polymerization. The graft copolymer in Example 10 is grown directly from the LCO (or other particulate cathode material) surface, so that a post encapsulation process is not required.

LCO is first coated with a thin layer (1 nm) of silica by alkaline hydrolysis of tetraethylorthosilicate in water in the presence of LCO grains, or from sodium silicate ($Na_2SiO_3$, water glass) in water in the presence of the cathode particles by controlling the pH with dilute $H_2SO_4$. LCO is then treated with a vinylsilane coupling agent (e.g., vinyltrialkoxysilane or trialkoxy propylmethacrylate silane). The result is an LCO surface bearing a reactive vinyl group. The modified LCO is added as an extra component to the reaction mixture for the formation of the poly(hexafluoromethacrylate) described in Example 10, thus causing the poly(hexafluoroisopropylmethacrylate) backbone to become covalently attached to the LCO surface. Growth of the thiophene graft then proceeds as discussed in Example 10 in the presence of the modified LCO, forming a conductive, repulsive encapsulant on the particle surface.

Encapsulant thickness could be controlled by varying the molecular weights of the poly(hexafluoromethacrylate) chains. Better control of polymerization could be obtained by carrying out a controlled radical polymerization of the hexafluoromethacrylate (e.g., atom-transfer polymerization or stabilized free-radical polymerization). In this case, the LCO surface would be modified with an appropriate initiation moiety (e.g., an organic chloride or a TEMPO (2,2,6, 6-tetramethylpiperidinooxy)-capped acrylate, respectively) rather than the vinylsilane.

EXAMPLE 12

This prophetic example describes encapsulation with a block copolymer of polythiophene and/or polyalkylenedioxythiophene with poly(hexafluoroisopropylmethacrylate). Encapsulation is carried out with a block copolymer of polythiophene or a modified polythiophene, and poly (hexafluoroisopropylmethacrylate). A first block of poly (hexafluoroisopropylmethacrylate) is formed by, for example, anionic polymerization. Hexafluoroisopropylmethacrylate is mixed in dry THF and n-butyl lithium is added. The living polymer thus formed is capped with a thiophene unit by addition of 2-bromomethyl thiophene. Thereafter the polymer is mixed with thiophene or, for example, Th-FD, and $FeCl_3$ in $CHCl_3$ or other suitable solvent, and reacted for 4 hours to polymerize the thiophene block. This polymer is then used as an encapsulant in a fluidized bed by a spraying process as discussed above. The use of hexafluoroisopropylmethacrylate in this example is illustrative, and is not intended to be limiting. Any suitable, low refractive index monomer could be used in its place, as long as it is soluble in the reaction medium.

EXAMPLE 13

This example describes direct fluorination of an alkyl thiophene and/or alkyl alkylenedioxythiophene encapsulant. An encapsulant layer composed of a thiophene and/or EDOT system as disclosed herein is applied using spray drying, solution, electro- or chemodeposition, other vaporization/deposition techniques, or a combination thereof. These materials are subsequently fluorinated via direct fluorination of the encapsulant layer. Non-limiting examples of useful fluorination methods include, without limitation, direct exposure of the polymer to fluorine gas or a combination of fluorine gas and a delivery gas. Suitable delivery gases include, but are not limited to, nitrogen, argon, and other inert gases.

The following is a prophetic example of depositing a polythiophene based polymer onto LCO, and fluorinating the deposited polymer. A thiophene monomer, for example, poly(3-hexylthiophene), is polymerized in solution to form an encapsulant by reaction with, for example, 4 equivalents of $FeCl_3$. Other suitable polymerization methods for thiophenes are well known in the art and can be substituted here. LCO is then coated with the encapsulant by spraying the encapsulant solution in a fluidized bed of LCO grains with heating to remove the solvent. The encapsulant is, for example, directly fluorinated by exposure to fluorine and nitrogen gas at 1.4% and 98.6%, respectively, for 30 minutes.

EXAMPLE 14

This example describes direct fluorination of polyethylenedioxythiophene (PEDOT) films. One-hundred-micron-thick Baytron P film samples were prepared by placing 3 mL aliquots of Baytron P emulsion on a fluoroethylene propylene (FEP) film substrate, and evaporating water overnight, first at room temperature, and then by heating in an air oven at 110° C. for several hours. The resulting free-standing Baytron P film samples were treated at room temperature with gaseous fluorine diluted with nitrogen using several fluorine concentrations and treatment times, which are listed in Table I. After flushing the reactor with nitrogen, the samples were stored in ambient atmosphere.

Wetting properties of the starting and fluorinated Baytron P films were evaluated by placing a 20 µl droplet of xylene on the surface of the film and measuring its spreading and diameter. The xylene droplet spread to a spot 8 mm to 10 mm in diameter on the untreated film, but the fluorinated film had very poor wetting properties (droplet diameter of 2 mm to 3 mm). Electrical conductivity of the untreated and fluorinated Baytron P films was measured by the 4-probe van der Pauw method by placing four small silver ink contacts around the circumference of the disk-shaped film samples. The results are summarized in Table I.

TABLE I

Properties of Baytron P films fluorinated in the gas phase

| Baytron P film sample | $F_2$ conc. in $N_2$ (vol. %) | Fluorination time (h) | Weight gain (%) | Wetting in xylene | Conductivity (S/cm) |
|---|---|---|---|---|---|
| 1 | N/A | untreated | N/A | wetted | 0.8 |
| 2 | 1.4 | 0.5 | 7.2 | non-wetting | 0.065 |
| 3 | 5 | 2 | 9.6 | non-wetting | 0.07 |
| 4 | 0→20 | 6 (4 + 2) | 18.1 | non-wetting | 0.05 |

EXAMPLE 15

This prophetic example describes deposition of a highly conducting polymer followed by deposition of a non-conducting polymer with a low refractive index. A first highly conducting polymer is deposited onto the surface of particles following the procedures for coating poly(EDOT) onto particles as described in Example 7. The coated particles are dried and ground with a mortar and pestle, or similar grinding technique such as jet milling, hammer milling, attritor milling, or ball milling. The dried and ground powder is placed into a solution with a fluorinated monomer (e.g., based on acrylate, methacrylate, or styrene polymers) such that a layer of less than 10 nm is polymerized and deposited on the particle surface. A low refractive index coating (e.g., based on Teflon® (DuPont, polytetrafluoroethylene), acrylate, methacrylate, or styrene polymers) also could be applied to the dried and ground powder by vapor phase polymerization/deposition or spray drying of prepolymerized polymers such that a layer of less than 100 nm is deposited on the particle surface.

As will be apparent to one of ordinary skill in the art from a reading of this disclosure, the present invention can be embodied in forms other than those specifically disclosed above without departing from the spirit or essential characteristics of the invention. The particular embodiments of the invention described above are, therefore, to be considered as illustrative and not restrictive. The scope of the invention is as set forth in the appended claims, rather than being limited to the examples contained in the foregoing description.

What is claimed is:

1. A coated particle comprising an electroactive particle having a coating deposited thereon, wherein the coating comprises a polymer having a conductive component linked to a low refractive index component, wherein the polymer is a copolymer of a conductive polymer and a low refractive index polymer.

2. The coated particle of claim 1, wherein the conductive component and the low refractive index component are linked by covalent bonding.

3. The coated particle of claim 1, wherein the coating comprises less than about 10 vol. % of the particle.

4. The coated particle of claim 3, wherein the coating comprises less than about 5 vol. % of the particle.

5. The coated particle of claim 4, wherein the coating comprises less than about 2 vol. % of the particle.

6. The coated particle of claim 5, wherein the coating comprises less than about 1 vol. % of the particle.

7. The coated particle of claim 1, wherein the polymer is a block copolymer of a conductive polymer and a low refractive index polymer.

8. The coated particle of claim 1, wherein the polymer is a graft copolymer having a conductive polymer backbone with low refractive index polymer side chains.

9. The coated particle of claim 1, wherein the polymer is a graft copolymer having a low refractive index polymer backbone with conductive polymer side chains.

10. The coated particle of claim 1, wherein the low refractive index component comprises fluorine.

11. The coated particle of claim 10, wherein the low refractive index component comprises one or more fluoroalkyl and/or fluoroaryl groups.

12. The coated particle of claim 1, wherein the conductive component comprises one or more groups selected from polyaniline, polypyrrole, polyacetylene, polyphenylene, polythiophene, polyalkylenedioxythiophene, and combinations thereof.

13. The coated particle of claim 1, wherein the polymer comprises one or more groups selected from Structures I-V:

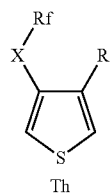

Th (I)

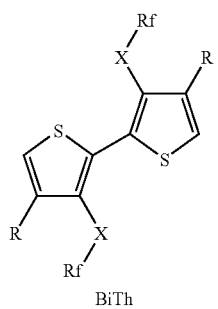

BiTh (II)

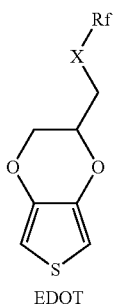

EDOT (III)

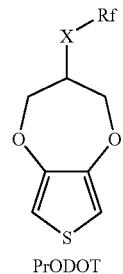

PrODOT (IV)

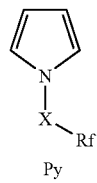

Py (V)

wherein Rf is a fluorinated alkyl group, aryl group, or combination thereof, X is a linking group attaching Rf to the polymer backbone, and R is a pendant group chosen from X-Rf, H, and $C_1$-$C_{15}$ alkyl.

14. The coated particle of claim 13, wherein X includes one or more groups selected from alkyl, ether, thioether, ester, thioester, amine, amide, and benzylic groups.

15. The coated particle of claim 1, wherein the polymer comprises one or more groups selected from EDOT-F (pentadecafluoro octanoic acid 2,3-dihydro-thieno[3,4-b][1,4]dioxin-2-ylmethyl ester), Th-O-1,7 (3-pentadecafluorooctyloxythiophene), Me-Th-O-1,7 (3-methyl-4-pentadecafluorooctyloxythiophene), and PrODOT-F (propylenedioxythiophene pentadecafluorooctane ester).

16. The coated particle of claim 1, wherein the coating is deposited by chemical or electrochemical polymerization of one or more monomers onto the surface of the electroactive particle.

17. The coated particle of claim 16, wherein the polymerization comprises polymer growth into a continuous shell on the surface of the electroactive particle.

18. The coated particle of claim 16, wherein the polymerization comprises polymer growth from one or more monomers chemically bound to the surface of the electroactive particle.

19. The coated particle of claim 1, wherein the electroactive particle comprises a cathode material.

20. The coated particle of claim 1, wherein the electroactive particle comprises an anode material.

21. The coated particle of claim 1, wherein the polymer has an electronic conductivity of at least about $10^{-2}$ S/cm.

22. The coated particle of claim 21, wherein the polymer has an electronic conductivity of at least about $10^{-1}$ S/cm.

23. The coated particle of claim 22, wherein the polymer has an electronic conductivity of at least about 1 S/cm.

24. The coated particle of claim 1, wherein the coating further comprises a second polymer that is conductive.

25. The coated particle of claim 24, wherein the coating comprises an underlayer comprising the second conductive polymer and an overlayer comprising the polymer having a conductive component and a low refractive index component.

26. The coated particle of claim 25, wherein the coating is deposited by chemical or electrochemical polymerization of the second conductive polymer onto the surface of the electroactive particle, followed by chemical or electrochemical polymerization of the polymer having a conductive component and a low refractive index component onto the surface of the electroactive particle coated with the second conductive polymer.

27. A coated particle comprising an electroactive particle having a coating deposited thereon, wherein the coating comprises a first layer including a conductive component and a second layer including a low refractive index component.

28. The coated particle of claim 27, wherein the electroactive particle comprises a cathode material.

29. The coated particle of claim 27, wherein the electroactive particle comprises an anode material.

30. The coated particle of claim 27, wherein each of the first and second layers has a thickness of about 0.2 μm or less.

31. The coated particle of claim 30, wherein each of the first and second layers has a thickness of about 0.1 μm or less.

32. The coated particle of claim 27, wherein the second layer further includes a conductive component.

33. The coated particle of claim 32, wherein the low refractive index component and the conductive component of the second layer are linked.

34. The coated particle of claim 27, wherein the low refractive index component includes one or more non-conducting polymers chosen from polytetrafluoroethylene, acrylate, methacrylate, and styrene polymers, and derivatives thereof.

35. The coated particle of claim 27, wherein the coating is deposited by chemical or electrochemical polymerization of a conductive polymer onto the surface of the electroactive particle followed by deposition of a non-conducting polymer of low refractive index onto the surface of the electroactive particle coated with the conductive polymer.

36. The coated particle of claim 35, wherein the non-conducting polymer of low refractive index is deposited by vapor phase polymerization or spray drying onto the surface of the electroactive particle coated with the conductive polymer.

37. An electrochemical device comprising:
(a) an anode, a cathode, and an electrolyte in contact with and separating the anode and cathode;
(b) a cathode current collector in electronic communication with the cathode; and
(c) an anode current collector in electronic communication with the anode,
wherein at least one of the anode and cathode comprises an electroactive particle having a coating deposited thereon, wherein the coating comprises a polymer having a conductive component linked to a low refractive index component, and wherein the polymer is a copolymer of a conductive polymer and a low refractive index polymer.

38. The electrochemical device of claim 37, wherein the anode comprises an electroactive particle having a coating deposited thereon, wherein the coating comprises a polymer having a conductive component linked to a low refractive index component, and wherein the polymer is a copolymer of a conductive polymer and a low refractive index polymer, and wherein the anode current collector has a coating deposited thereon, wherein the anode current collector coating comprises the same polymer as the anode particle coating.

39. The electrochemical device of claim 37, wherein the cathode comprises an electroactive particle having a coating deposited thereon, wherein the coating comprises a polymer having a conductive component linked to a low refractive index component, and wherein the polymer is a copolymer of a conductive polymer and a low refractive index polymer, and wherein the cathode current collector has a coating deposited thereon, wherein the cathode current collector coating comprises the same polymer as the cathode particle coating.

40. An electrochemical device comprising:
(a) an anode, a cathode, and an electrolyte in contact with and separating the anode and cathode;
(b) a cathode current collector in electronic communication with the cathode; and
(c) an anode current collector in electronic communication with the anode,
wherein at least one of the anode and cathode comprises an electroactive particle having a coating deposited thereon, wherein the coating comprises a first layer including a conductive component and a second layer including a low refractive index component.

41. The electrochemical device of claim 40, wherein the anode comprises an electroactive particle having a coating deposited thereon, wherein the coating comprises a first layer including a conductive component and a second layer including a low refractive index component, and wherein the anode current collector has a coating deposited thereon, wherein the anode current collector coating comprises the same first and second layers as the anode particle coating.

42. The electrochemical device of claim 40, wherein the cathode comprises an electroactive particle having a coating deposited thereon, wherein the coating comprises a first layer including a conductive component and a second layer including a low refractive index component, and wherein the cathode current collector has a coating deposited thereon, wherein the cathode current collector coating comprises the same first and second layers as the cathode particle coating.

43. An electrochemical device comprising:
(a) an anode, a cathode, and an electrolyte in contact with and separating the anode and cathode;
(b) a cathode current collector in electronic communication with the cathode; and
(c) an anode current collector in electronic communication with the anode,
wherein the anode comprises an electroactive particle having a coating deposited thereon, wherein the coating comprises a homogeneous blend of a conductive polymer and a low refractive index polymer, wherein the conductive polymer and the low refractive index polymer do not form phases with lengthscales larger than about 0.25 μm,
and wherein the anode current collector has a coating deposited thereon, wherein the anode current collector coating comprises the same blend as the anode particle coating.

44. An electrochemical device comprising:
(a) an anode, a cathode, and an electrolyte in contact with and separating the anode and cathode;
(b) a cathode current collector in electronic communication with the cathode; and (c) an anode current collector in electronic communication with the anode, wherein the cathode comprises an electroactive particle having a coating deposited thereon, wherein the coating comprises a homogeneous blend of a conductive polymer and a low refractive index polymer, wherein the conductive polymer and the low refractive index polymer do not form phases with lengthscales larger than about 0.25 μm, and wherein the cathode current collector has a coating deposited thereon, wherein the cathode current collector coating comprises the same blend as the cathode particle coating.

45. A coated current collector comprising a current collector having a coating deposited thereon, wherein the coating comprises a polymer having a conductive component linked to a low refractive index component.

46. A coated current collector comprising a current collector having a coating deposited thereon, wherein the coating comprises a first layer including a conductive component and a second layer including a low refractive index component.

47. A coated current collector comprising a current collector having a coating deposited thereon, wherein the coating comprises a homogeneous blend of a conductive polymer and a low refractive index polymer, wherein the conductive polymer and the low refractive index polymer do not form phases with lengthscales larger than about 0.25 μm.

48. A composition for encapsulation of an electroactive particle or current collector, the composition comprising a polymer including one or more monomer units of Th-O-1,7 (3-pentadecafluorooctyloxythiophene).

* * * * *